United States Patent
Van Baalen et al.

(10) Patent No.: US 12,373,697 B2
(45) Date of Patent: Jul. 29, 2025

(54) BAYESIAN BITS JOINT MIXED-PRECISION QUANTIZATION AND STRUCTURED PRUNING USING DECOMPOSED QUANTIZATION AND BAYESIAN GATES

(71) Applicant: QUALCOMM Incorporated, San Diego, CA (US)

(72) Inventors: Marinus Willem Van Baalen, Amsterdam (NL); Christos Louizos, Amsterdam (NL); Markus Nagel, Amsterdam (NL); Tijmen Pieter Frederik Blankevoort, Amsterdam (NL); Rana Ali Amjad, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 616 days.

(21) Appl. No.: 17/759,725

(22) PCT Filed: Apr. 29, 2021

(86) PCT No.: PCT/US2021/030009
§ 371 (c)(1),
(2) Date: Jul. 29, 2022

(87) PCT Pub. No.: WO2021/222656
PCT Pub. Date: Nov. 4, 2021

(65) Prior Publication Data
US 2023/0058159 A1     Feb. 23, 2023

(30) Foreign Application Priority Data

Apr. 29, 2020 (GR) ............................. 20200100216

(51) Int. Cl.
*G06N 3/082*     (2023.01)

(52) U.S. Cl.
CPC .................................... *G06N 3/082* (2013.01)

(58) Field of Classification Search
CPC ......... G06N 3/082; G06N 3/047; G06N 3/063
See application file for complete search history.

(56) References Cited

PUBLICATIONS

Lin, Darryl, Sachin Talathi, and Sreekanth Annapureddy. "Fixed point quantization of deep convolutional networks." International conference on machine learning. PMLR, 2016. (Year: 2016).*

(Continued)

*Primary Examiner* — William Spieler
(74) *Attorney, Agent, or Firm* — Polsinelli LLP

(57) ABSTRACT

Various embodiments include methods and devices for joint mixed-precision quantization and structured pruning. Embodiments may include determining whether a plurality of gates of quantization and pruning gates are selected for combination, and in response to determining that the plurality of gates are selected for combination, iteratively for each successive gate of the plurality of gates selected for combination quantizing a residual error of a quantized tensor to a scale of a next bit-width producing a residual error quantized tensor in which the next bit-width increases for each successive iteration, and adding the quantized tensor and the residual error quantized tensor producing a next quantized tensor in which the next quantized tensor has the next bit-width, and in which the next quantized tensor is the quantized tensor for a successive iteration.

66 Claims, 8 Drawing Sheets

(56) References Cited

PUBLICATIONS

Wang, Kuan, et al. "Haq: Hardware-aware automated quantization with mixed precision." Proceedings of the IEEE/CVF conference on computer vision and pattern recognition. 2019. (Year: 2019).*
Wu, Bichen, et al. "Mixed precision quantization of convnets via differentiable neural architecture search." arXiv preprint arXiv:1812.00090 (2018). (Year: 2018).*
Lobacheva, Ekaterina, Nadezhda Chirkova, and Dmitry Vetrov. "Bayesian sparsification of gated recurrent neural networks." arXiv preprint arXiv:1812.05692 (2018). (Year: 2018).*
Ullrich, Karen, Edward Meeds, and Max Welling. "Soft weight-sharing for neural network compression." arXiv preprint arXiv:1702.04008 (2017). (Year: 2017).*
Mummadi, Chaithanya Kumar, et al. "Group Pruning Using a Bounded-â p Norm for Group Gating and Regularization." German Conference on Pattern Recognition. Cham: Springer International Publishing, 2019. (Year: 2019).*
International Search Report and Written Opinion; PCT/US2021/030009; mailed Sep. 28, 2021; International Searching Authority; 12 pages.
Bichen Wu; "Efficient Deep Neural Networks", arxiv .org, Cornell University Li bra ry, 201 Olin Li bra ry Cornell University Ithaca, NY 14853, Aug. 21, 2019 (Aug. 21, 2019), XP081468475, 159 pages.
Yunchao Gong et al., "Compressing Deep Convolutional Networks using Vector Quantization" Dec. 18, 2014 (Dec. 18, 2014), pp. 1-10, XP055262159; Retrieved from the Internet: URL: hhttps://ar5iv.labs.arxiv.org/html/1412.6115 [retrieved on Apr. 1, 2016] Section 3.2.4; 12 pages.
Yunhui Guo; "A Survey on Methods and Theories of Quantized Neural Networks", arxiv.org, Cornell University Library, 201 Olin Library Cornell University Ithaca, NY 14853, Aug. 13, 2018 (Aug. 13, 2018), XP080896862, Sections 3, 4; p. 3-p. 8 (19 pages).
Bohan Zhuang et al.; "Effective Training of Convolutional Neural Networks with Low-bitwidth Weights and Activations", arxiv.org, Cornell University Library, 201 Olin Library Cornell University Ithaca, NY 14853, Aug. 10, 2019 (Aug. 10, 2019), XP081461150, abstract Section 3; p. 3-p. 5 (12 pages).
Tung Frederick et al., "Deep Neural Network Compression by In-Parallel Pruning-Quantization", IEEE Transactions on Pattern Analysis and Machine Intelligence, IEEE Computer Society, USA, vol. 42, No. 3, Dec. 11, 2018 (Dec. 11, 2018), pp. 568-579, XP011769908, ISSN: 0162-8828, DOI: 10.1109/TPAMI.2018.2886192 [retrieved on Feb. 5, 2020] p. 3-p. 4 (12 pages).

* cited by examiner

BAYESIAN BITS JOINT MIXED-PRECISION QUANTIZATION AND STRUCTURED PRUNING USING DECOMPOSED QUANTIZATION AND BAYESIAN GATES

RELATED APPLICATIONS

This application claims the benefit of priority to Greek Application No. 20200100216 entitled "Joint Mixed-Precision Quantization And Structured Pruning Using Decomposed Quantization And Bayesian Gates" filed Apr. 29, 2020, the entire contents of which are incorporated herein by reference.

BACKGROUND

Neural network quantization is often applied to reduce the high compute requirements of neural networks. Quantization allows efficient integer operations instead of expensive floating-point operations. To quantize a neural network, a quantization bit-width must be chosen. Traditionally, the same quantization bit-width is used for each (weight or activation) tensor in a network.

SUMMARY

Various disclosed aspects may include apparatuses and methods for joint mixed-precision quantization and structured pruning. Various aspects may include determining whether a plurality of gates of quantization and pruning gates are selected for combination, and in response to determining that the plurality of gates are selected for combination, iteratively for each successive gate of the plurality of gates selected for combination, quantizing a residual error of a quantized tensor to a scale of a next bit-width producing a residual error quantized tensor in which the next bit-width increases for each successive iteration, and adding the quantized tensor and the residual error quantized tensor producing a next quantized tensor, in which the next quantized tensor has the next bit-width, and the next quantized tensor is the quantized tensor for a successive iteration.

Some aspects may further include determining whether a successive gate of the quantization and pruning gates to the plurality of gates is selected for combination, and outputting the quantized tensor of a last iteration in response to determining that the successive gate is not selected for combination.

Some aspects may further include receiving a tensor by the quantization and pruning gates, clipping the tensor to a range of values producing a clipped tensor, and quantizing the clipped tensor to a lowest bit-width producing a clipped quantized tensor, in which quantizing a residual error of a quantized tensor to a scale of a next bit-width for a first iteration may include quantizing a residual error of the clipped quantized tensor to the scale of the next bit-width, and in which the next bit-width is greater than the lowest bit-width.

Some aspects may further include determining whether a gate of the quantization and pruning gates preceding the plurality of gates is selected for combination, and outputting the clipped quantized tensor in response to determining that the gate preceding the plurality of gates is not selected for combination.

In some aspects, quantizing a residual error of a quantized tensor to a scale of a next bit-width producing a residual error quantized tensor, and adding the quantized tensor and the residual error quantized tensor producing a next quantized tensor is further performed in response to determining that the gate preceding the plurality of gates is selected for combination.

Some aspects may further include, in response to determining that the plurality of gates are selected for combination, iteratively for each successive gate of the plurality of gates selected for combination computing a residual error of a quantized tensor by subtracting the quantized tensor from the clipped tensor.

Some aspects may further include receiving a weight tensor by the quantization and pruning gates, determining whether a gate of the quantization and pruning gates preceding the plurality of gates is selected for combination, and outputting a tensor configured to prune the weight tensor in response to determining that that the gate preceding the plurality of gates is not selected for combination.

Some aspects may further include training the quantization and pruning gates using a regularizer (e.g., a principled regularizer) configured to achieve a target balance of efficiency of a neural network and accuracy of the neural network by selecting fewer gates for combination producing a lower bit-width and more pruned quantized tensor favoring efficiency in comparison to selecting more gates for combination producing a higher bit-width and less pruned quantized tensor favoring accuracy.

Some aspects may further include setting a hyperparameter for the regularizer such that the hyperparameter strengthens regularization on a basis of an efficiency factor of the neural network.

Some aspects may further include setting a hyperparameter for the regularizer configured to control the target balance of efficiency of a neural network and accuracy of the neural network.

In some aspects, training the quantization and pruning gates using a regularizer may include training the quantization and pruning gates to select no gates for combination for a group of weights of a weight tensor, in which selecting no gates prunes the group of weights reducing a cost of an efficiency factor of the neural network.

Some aspects may further include training the quantization and pruning gates for determining values of gates, including the plurality of gates, based on variational approximation of a posterior distribution of the quantization and pruning gates, in which the values of the gates are configured to indicate to the quantization and pruning gates whether the gates are selected for combination.

In some aspects, quantizing a residual error of a quantized tensor to a scale of a next bit-width producing a residual error quantized tensor in which the next bit-width increases for each successive iteration may include quantizing the residual error of the quantized tensor to the scale of the next bit-width producing the residual error quantized tensor in which the next bit-width doubles for each successive iteration.

Various aspects may include apparatuses and methods for generating a mixed-precision artificial neural network. Various aspects may include quantizing a first layer of the mixed-precision artificial neural network at a first precision determined using corresponding stochastic gates of quantization and pruning gates, and quantizing a second layer of the mixed-precision artificial neural network at a second precision determined using corresponding stochastic gates of the quantization and pruning gates, in which the first precision and the second precision are different.

Some aspects may further include determining whether a plurality of stochastic gates of the quantization and pruning gates are selected for combination and in response to determining that the plurality of stochastic gates are selected for combination, iteratively for each successive stochastic gate selected for combination quantizing a residual error of a quantized tensor to a scale of a next bit-width producing a residual error quantized tensor, in which the next bit-width increases for each successive iteration, and adding the quantized tensor and the residual error quantized tensor producing a next quantized tensor, in which the next quantized tensor has the next bit-width, and in which the next quantized tensor is the quantized tensor for a successive iteration.

Some aspects may further include determining whether a successive stochastic gate to the plurality of stochastic gates is selected for combination, and outputting the quantized tensor of a last iteration in response to determining that the successive stochastic gate is not selected for combination.

Some aspects may further include receiving a tensor by the quantization and pruning gates, clipping the tensor to a range of values producing a clipped tensor, and quantizing the clipped tensor to a lowest bit-width producing a clipped quantized tensor, in which quantizing a residual error of a quantized tensor to a scale of a next bit-width for a first iteration includes quantizing a residual error of the clipped quantized tensor to the scale of the next bit-width, in which the next bit-width is greater than the lowest bit-width.

Some aspects may further include determining whether a stochastic gate of the quantization and pruning gates preceding the plurality of stochastic gates is selected for combination, and outputting the clipped quantized tensor in response to determining that the stochastic gate preceding the plurality of stochastic gates is not selected for combination.

In some aspects, quantizing a residual error of a quantized tensor to a scale of a next bit-width producing a residual error quantized tensor, and adding the quantized tensor and the residual error quantized tensor producing a next quantized tensor may be further performed in response to determining that the stochastic gate preceding the plurality of stochastic gates is selected for combination.

Some aspects may further include, in response to determining that the plurality of stochastic gates are selected for combination, iteratively for each successive stochastic gate of the plurality of stochastic gates selected for combination computing a residual error of a quantized tensor by subtracting the quantized tensor from the clipped tensor.

Some aspects may further include receiving a weight tensor by the quantization and pruning gates, determining whether a stochastic gate of the quantization and pruning gates preceding the plurality of stochastic gates is selected for combination, and outputting a tensor configured to prune the weight tensor in response to determining that that the stochastic gate preceding the plurality of stochastic gates is not selected for combination.

Some aspects may further include training the quantization and pruning gates using a regularizer configured to achieve a target balance of efficiency of a neural network and accuracy of the neural network by selecting fewer stochastic gates for combination thereby producing a lower bit-width and more pruned quantized tensor favoring efficiency in comparison to selecting more stochastic gates for combination producing a higher bit-width and less pruned quantized tensor favoring accuracy.

Some aspects may further include setting a hyperparameter for the regularizer such that the hyperparameter strengthens regularization on a basis of an efficiency factor of the neural network.

Some aspects may further include setting a hyperparameter for the regularizer configured to control the target balance of efficiency of a neural network and accuracy of the neural network.

In some aspects, training the quantization and pruning gates using a regularizer may include training the quantization and pruning gates to select no stochastic gates for combination for a group of weights of a weight tensor, in which selecting no stochastic gates prunes the group of weights reducing a cost of an efficiency factor of the neural network.

Some aspects may further include training the quantization and pruning gates for determining values of stochastic gates, including the plurality of stochastic gates, based on variational approximation of a posterior distribution of the quantization and pruning gates, in which the values of the stochastic gates are configured to indicate to the quantization and pruning gates whether the stochastic gates are selected for combination.

In some aspects, quantizing a residual error of a quantized tensor to a scale of a next bit-width producing a residual error quantized tensor may include quantizing the residual error of the quantized tensor to the scale of the next bit-width producing the residual error quantized tensor, in which the next bit-width doubles for each successive iteration.

Further aspects include a computing device having a processing device configured with executable instructions to perform operations of any of the methods summarized above. Further aspects include a computing device having means for performing functions of any of the methods summarized above. Further aspects include a non-transitory processor-readable medium having stored thereon processor-executable instructions configured to cause a processor and other components of a computing device to perform operations of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
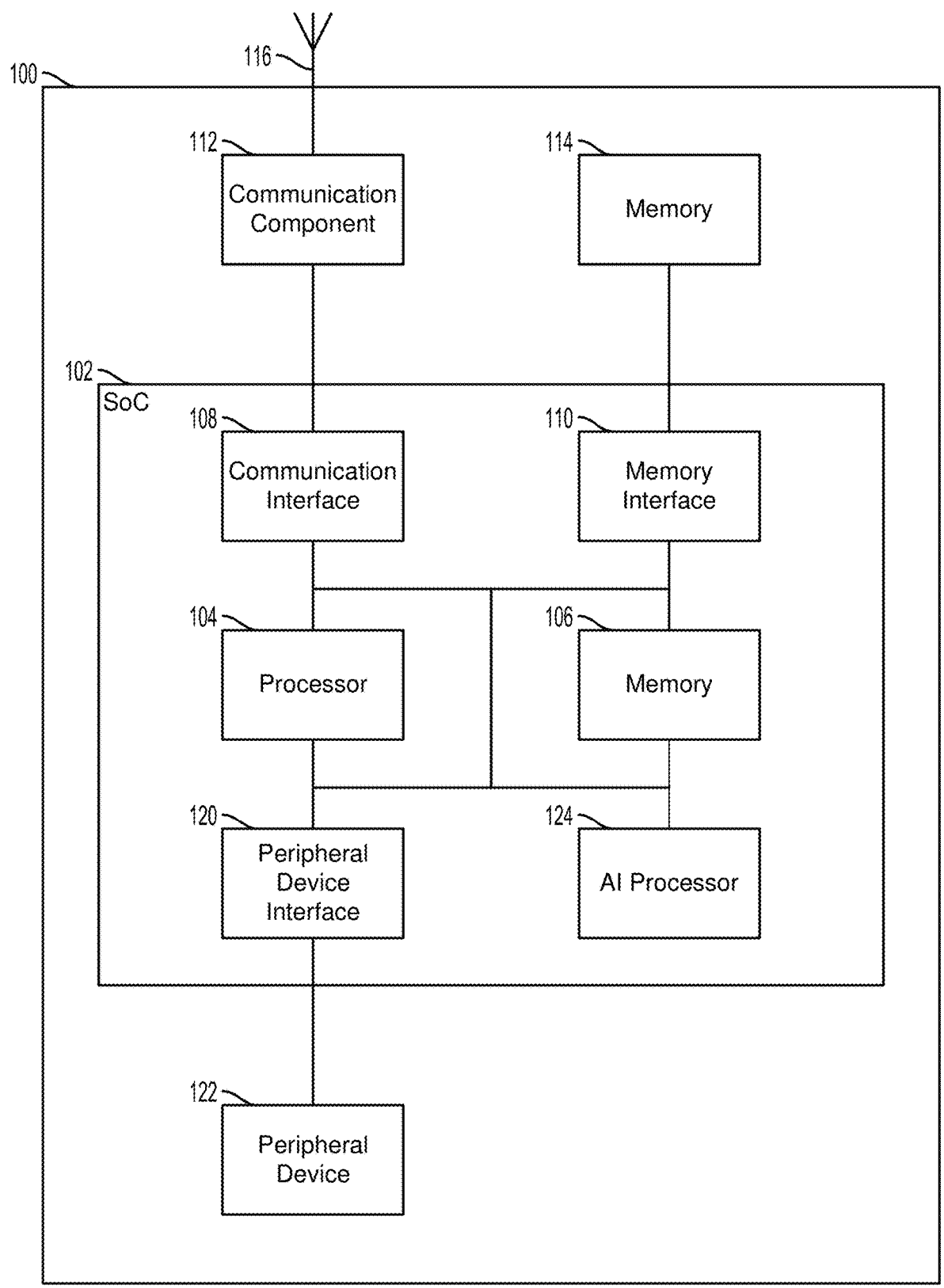
FIG. 1 is a component block diagram illustrating an example computing device suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments may include methods, and computing devices implementing such methods for joint mixed-precision quantization and structured pruning using decomposed quantization and learnable gates, such as Bayesian gates. In some embodiments, the learnable gates may be stochastic gates. Some embodiments may include learnable gates configured to control both a bit-width and structured sparsity of an input tensors to a decomposed quantization procedure. In some embodiments control of the bit-width of an input tensor may include quantization of the input tensor using a decomposition of a quantization operation enabling gating for various bit-width quantized tensors. The decomposition of the quantization operation maybe configured to produce quantized tensors having bit-widths aligned with hardware configurations. In some embodiments, control of structured pruning of the input tensor may include gating individual and/or groups of input tensor values based on training using a regularizer (e.g., a principled regularizer) configured to favor hardware-efficient models and accuracy. The structured pruning of the input tensor maybe configured to produce quantized tensors having pruned input tensor values. Various embodiments of joint mixed-precision quantization and structured pruning using decomposed quantization and learnable gates, such as Bayesian gates, may be implemented for training with neural networks to achieve a combination of hardware-efficiency and accuracy and/or for identifying a neural network having the combination of hardware-efficiency and accuracy.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers (such as in vehicles and other larger systems), servers, multimedia computers, and game consoles.

Mixed precision quantization having different bit-widths for different tensors may yield improved accuracy to efficiency trade-offs compared to quantizing all tensors to the same bit-width. Some tensors may be less sensitive to quantization noise than others, which may imply that lower bit-widths may be used for tensors that are more robust to quantization noise.

Structured pruning may be applied alongside quantization to reduce neural network compute requirements. Pruning removes weights or activations from a neural network to reduce the total amount of computations. Structured pruning groups weights and prunes weights per group instead of pruning weights individually. The weights that should be grouped for maximal efficiency gains depends on the target hardware (i.e., the processor or computing device that will implement the pruned neural network). Arbitrarily sparsifying a neural network may not yield efficiency gains on hardware.

The size of the space for mixed-precision bit-width configurations in a neural network depends exponentially on the number of tensors. Lowering the bit-width of one tensor in a neural network affects the quantization sensitivity of other tensors. Thus, the bit-width for any given tensor cannot be chosen in isolation. An efficient method is needed to find a good mixed precision configuration, because the full space of bit-width settings cannot be exhaustively searched using brute-force methods. Further, there are currently no methods for joint quantization and pruning. Various embodiments include methods, and computing devices implementing such methods for efficiently determining a mixed precision configuration using joint mixed-precision quantization and structured pruning that uses decomposed quantization and learnable gates, such as Bayesian gates.

Embodiment methods described herein include joint mixed-precision quantization and structured pruning using decomposed quantization and gates, which enable combining mixed-precision quantization and structured pruning of tensors to produce quantized tensors for training of and/or inference generation by neural networks. Quantization and pruning gates may include learnable gates to control both the bit-width and structured sparsity for producing the quantized tensor. The quantization and pruning gates may employ decomposed quantization processes enabling gated control of the bit-width of and/or structured pruning of a tensor for producing the quantized tensor. A regularizer, such as a Bayesian regularizer or principled regularizer, may be implemented as a hyperparameter of the quantization and pruning gates to manipulate a selection of gates for a balance of computational complexity and accuracy in a neural network using the quantized tensor. As used herein the term "Bayesian gates" refers to the learnable quantization and pruning gates that may be trained using a Bayesian regularizer.

FIG. 1 illustrates a system including a computing device 100 suitable for use with various embodiments. The computing device 100 may include an SoC 102 with a processor 104, a memory 106, a communication interface 108, a memory interface 110, and a peripheral device interface 120. The computing device 100 may further include a communication component 112, such as a wired or wireless modem, a memory 114, an antenna 116 for establishing a wireless communication link, and/or a peripheral device 122. The processor 104 may include any of a variety of processing devices, for example a number of processor cores.

The term "system-on-chip" or "SoC" is used herein to refer to a set of interconnected electronic circuits typically, but not exclusively, including a processing device, a memory, and a communication interface. A processing device may include a variety of different types of processors 104 and/or processor cores, such as a general purpose processor, a central processing unit (CPU), a digital signal processor (DSP), a graphics processing unit (GPU), an accelerated processing unit (APU), a secure processing unit (SPU), a subsystem processor of specific components of the computing device, such as an image processor for a camera subsystem or a display processor for a display, an auxiliary processor, a single-core processor, a multicore processor, a controller, and/or a microcontroller. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and/or time references. Integrated circuits may be configured such that the components of the integrated circuit reside on a single piece of semiconductor material, such as silicon.

An SoC 102 may include one or more processors 104. The computing device 100 may include more than one SoC 102, thereby increasing the number of processors 104 and processor cores. The computing device 100 may also include processors 104 that are not associated with an SoC 102. Individual processors 104 may be multicore processors. The processors 104 may each be configured for specific purposes that may be the same as or different from other processors 104 of the computing device 100. One or more of the processors 104 and processor cores of the same or different configurations may be grouped together. A group of processors 104 or processor cores may be referred to as a multiprocessor cluster.

The memory 106 of the SoC 102 may be a volatile or non-volatile memory configured for storing data and processor-executable code for access by the processor 104 or by other components of SoC 102, including an AI processor 124. The computing device 100 and/or SoC 102 may include one or more memories 106 configured for various purposes. One or more memories 106 may include volatile memories such as random access memory (RAM) or main memory, or cache memory. These memories 106 may be configured to temporarily hold a limited amount of data received from a data sensor or subsystem, data and/or processor-executable code instructions that are requested from non-volatile memory, loaded to the memories 106 from non-volatile memory in anticipation of future access based on a variety of factors, and/or intermediary processing data and/or processor-executable code instructions produced by the processor 104 and/or AI processor 124 and temporarily stored for future quick access without being stored in non-volatile memory. In some embodiments, any number and combination of memories 106 may include one-time programmable or read-only memory.

The memory 106 may be configured to store data and processor-executable code, at least temporarily, that is loaded to the memory 106 from another memory device, such as another memory 106 or memory 114, for access by one or more of the processors 104 or by other components of SoC 102, including the AI processor 124. The data or processor-executable code loaded to the memory 106 may be loaded in response to execution of a function by the processor 104 or by other components of SoC 102, including the AI processor 124. Loading the data or processor-executable code to the memory 106 in response to execution of a function may result from a memory access request to the memory 106 that is unsuccessful, or a "miss," because the requested data or processor-executable code is not located in the memory 106. In response to a miss, a memory access request to another memory 106 or memory 114 may be made to load the requested data or processor-executable code from the other memory 106 or memory 114 to the memory 106. Loading the data or processor-executable code to the memory 106 in response to execution of a function may result from a memory access request to another memory 106 or memory 114, and the data or processor-executable code may be loaded to the memory 106 for later access.

The memory interface 110 and the memory 114 may work in unison to allow the computing device 100 to store data and processor-executable code on a volatile and/or non-volatile storage medium, and retrieve data and processor-executable code from the volatile and/or non-volatile storage medium. The memory 114 may be configured much like an embodiment of the memory 106 in which the memory 114 may store the data or processor-executable code for access by one or more of the processors 104 or by other components of SoC 102, including the AI processor 124. In some embodiments, the memory 114, being non-volatile, may retain the information after the power of the computing device 100 has been shut off. When the power is turned back on and the computing device 100 reboots, the information stored on the memory 114 may be available to the computing device 100. In some embodiments, the memory 114, being volatile, may not retain the information after the power of the computing device 100 has been shut off. The memory interface 110 may control access to the memory 114 and allow the processor 104 or other components of the SoC 12, including the AI processor 124, to read data from and write data to the memory 114.

An SoC 102 may also include an AI processor 124. The AI processor 124 may be a processor 104, a portion of a processor 104, and/or a standalone component of the SoC 102. The AI processor 124 may be configured to execute neural networks for processing activation values and weight values on the computing device 100. The computing device 100 may also include AI processors 124 that are not associated with the SoC 102. Such AI processors 124 may be standalone components of the computing device 100 and/or integrated into other SoCs 102.

Some or all of the components of the computing device 100 and/or the SoC 102 may be arranged differently and/or combined while still serving the functions of the various embodiments. The computing device 100 may not be limited to one of each of the components, and multiple instances of each component may be included in various configurations of the computing device 100.

Figure 2:
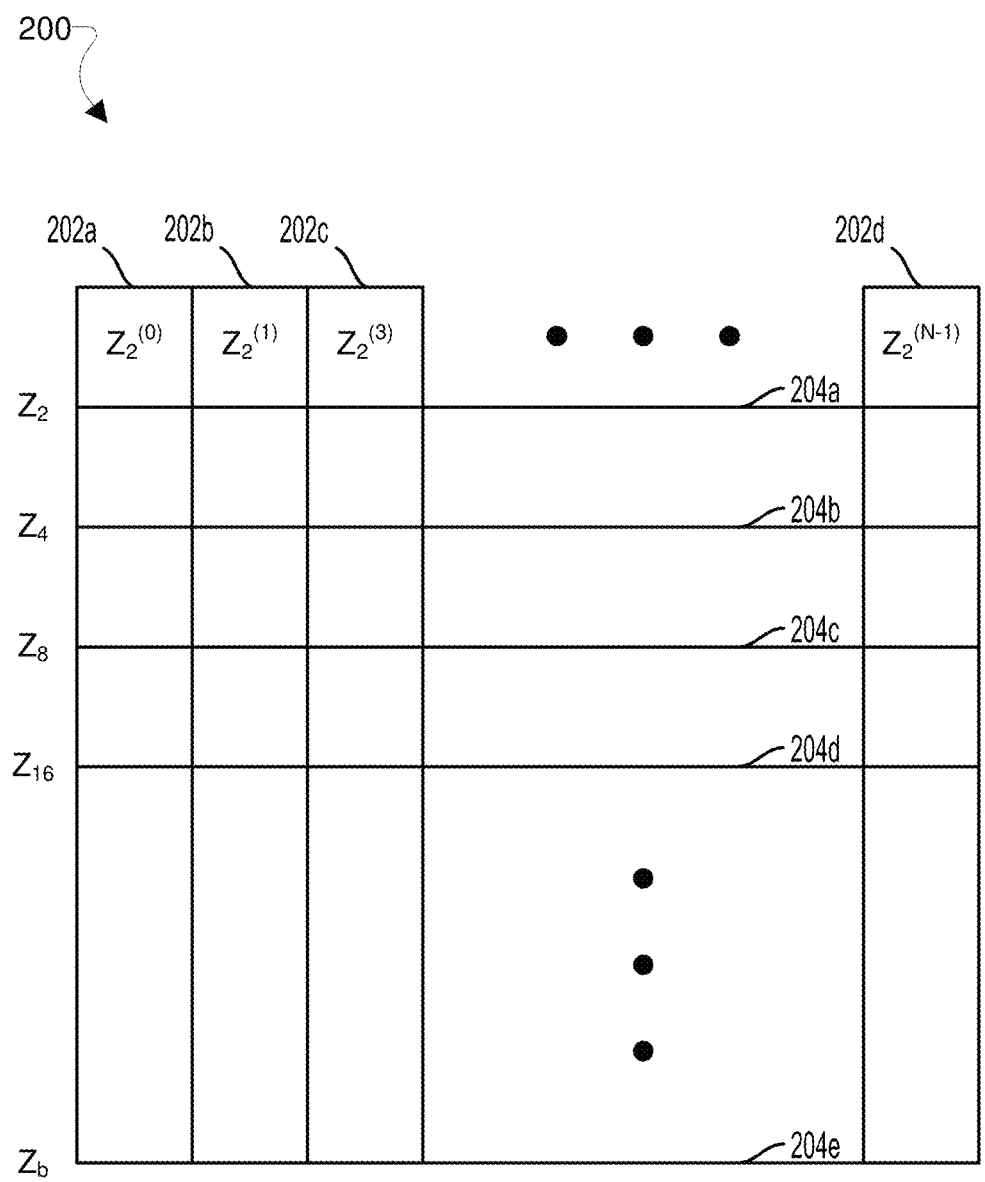
FIG. 2 is a graphic diagram illustrating an example application of mixed-precision quantization and structured pruning using decomposed quantization and learnable gates, such as Bayesian gates, in a neural network according to various embodiments.

FIG. 2 illustrates an example application of mixed-precision quantization and structured pruning using decomposed quantization and learnable gates, such as Bayesian gates, (also referred to herein as mixed-precision quantization and structured pruning) in a neural network according to various embodiments. In some embodiments, the learnable gates may be stochastic gates. With reference to FIG. 1, a processor 104, including an AI processor 124, may be configured to implement a neural network. Mixed-precision quantization and structured pruning may be applied at any layer 200 of the neural network. A layer 200 may be associated with any number of output channels 202a, 202b, 202c, 202d, such as a positive integer N greater than or equal to 1. The output channels 202a, 202b, 202c, 202d may represent the results of a neural network operation using weight values of a filter/kernel and input activation values for the layer 200.

Mixed-precision quantization and structured pruning may affect the bit-widths of the output channels 202a, 202b, 202c, 202d. For example, mixed-precision quantization and structured pruning may quantize weight values and/or activation values resulting in correspondingly quantized output channels 202a, 202b, 202c, 202d. For another example, mixed-precision quantization and structured pruning may prune weight values and/or activation values resulting in correspondingly pruned output channels 202a, 202b, 202c, 202d.

Any number of gates 204a, 204b, 204c, 204d, 204e may be used to control the bit-width of the tensors used by the layer 200. Controlling the bit-width of the tensors used by a layer is referred to as quantization of the tensors. A gate $Z_b$ may be the gate 204a, 204b, 204c, 204d, 204e that controls the bit-width b, where b may be any non-negative integer, such as values of powers of 2. For example, gate $Z_2$ 204a may quantize the tensors to a 4 bit-width, $Z_4$ 204b may quantize the tensors to a 4 bit-width, gate $Z_8$ 204c may quantize the tensors to an 8 bit-width, gate $Z_{16}$ 204d may quantize the tensors to a 16 bit-width. Similarly, gate $Z_b$ 204e for any other value b may quantize the tensors to a b bit-width. Methods for finding good quantization configurations may be constrained to consider hardware-friendly bit-widths. Not every bit-width yields improved efficiency on a given type of computing hardware. For example, no commercially available computing hardware exists to efficiently perform 7 bit computations. As such, in some embodiments, the bit-widths may be power-of-two bit-widths.

Locations of the gates 204a, 204b, 204c, 204d, 204e in the example illustrated in FIG. 2 may represent the bit-width of the tensors controlled by the gates 204a, 204b, 204c, 204d, 204e, with the bit-width increasing in the direction from top to bottom of the output channels 202a, 202b, 202c, 202d, 204e. To use tensors of a specific bit-width, a corresponding gate 204a, 204b, 204c, 204d, 204e may be selected for combination with all of the lower bit-width gates 204a, 204b, 204c, 204d. For example, control of the gates 204a, 204b, 204c, 204d, 204e may be represented by binary values, with $Z_b^{(N)}=0$ representing a gate 204a, 204b, 204c, 204d, 204e for an output channel 202a, 202b, 202c, 202d not selected for combination and $Z_b^{(N)}=1$ representing a gate 204a, 204b, 204c, 204d, 204e for an output channel 202a, 202b, 202c, 202d selected for combination.

As described further herein, the selection for combination of a series of sequential gates 204a, 204b, 204c, 204d, 204e may provide for cumulative calculations to produce the outputs of the output channels 202a, 202b, 202c, 202d. In some embodiments the gates 204a, 204b, 204c, 204d, 204e may be selected for all output channels 202a, 202b, 202c, 202d in the layer 200. For example, gates 204b, 204c, 204d, 204e, for which b is greater than or equal to 4, i.e., gates $Z_4$ through $Z_b$, may be selected for all output channels 202a, 202b, 202c, 202d to ensure that for each output channel 202a, 202b, 202c, 202d with an output, the outputs have the same bit-width.

In some embodiments, a gate 204a, 204b, 204c, 204d, 204e, such as gate 204a ($Z_2$) may be further configured to prune the tensor. The gate 204a, 204b, 204c, 204d, 204e may not be selected for combination for a group of weights of any number of weight tensors, as described further herein. For example, a group of weights may correspond to the output channel 202a, 202b, 202c, 202d for which the gate 204a may not be selected for combination. For such examples, the gates 204a, 204b, 204c, 204d, 204e may be selected for individual output channels 202a, 202b, 202c, 202d in the layer 200. For example, the gate 204a may be configured to output a value that may represent no value, such as zero (0). Such a value may result in no calculation for the output channel 202a, 202b, 202c, 202d. For example, the output channel 202c and/or the tensor for use by the output channel 202c may be pruned when gate $Z_2^{(3)}=0$.

For example, consider having an input that is quantized with a uniform quantizer with an associated bit-width b, where the step-size of the quantizer that depends on the bit-width b. An initial quantization of a tensor using a smallest bit-width, such as b=2, may be implemented with the selection of the gate $Z_2$ 204a generating a 2 bit-width quantized tensor. Higher bit-width quantization may be achieved by adding a quantized residual error of a previous quantization to the previous quantized tensor to generate a next quantized tensor. Continuing with the example, the quantized residual error of the initial quantization of the tensor using a 2 bit-width may be added to the 2 bit-width quantized tensor implemented with the selection of the gate $Z_4$ 204b generating a 4 bit-width quantized tensor. This example may be generalized to an arbitrary power of 2 bit-widths by sequentially doubling the precision of the quantized tensor through the addition of the quantized remaining residual error with selection of sequential gates 204a, 204b, 204c, 204d, 204e. In response to one of the gates 204a, 204b, 204c, 204d, 204e not being selected, the addition of all of the higher bit-width quantized, remaining residual errors may be avoided, thus controlling the bit-width of the quantized tensor. In response to the gate $Z_2$ 204a associated with the smallest bit-width not being selected, the tensor is assigned a value of 0, thus quantized to 0-bit and pruned away.

Figure 3:
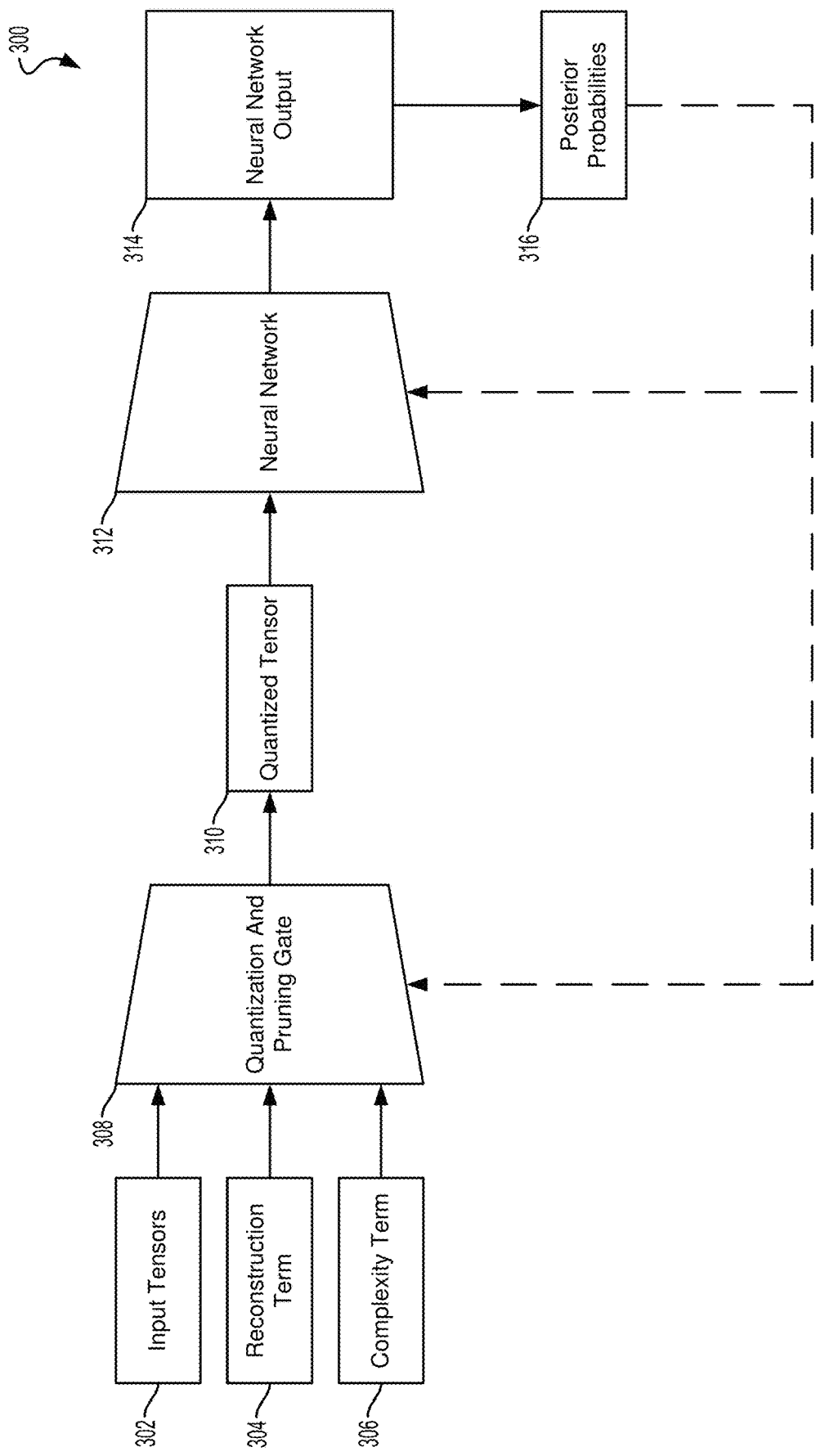
FIG. 3 is a component block and flow diagram illustrating an example system for training quantization and pruning gates and/or a neural network using mixed-precision quantization and structured pruning using decomposed quantization and learnable gates, such as Bayesian gates, suitable for implementing various embodiments.

FIG. 3 illustrates an example system 300 for training quantization and pruning gates and/or a neural network using mixed-precision quantization and structured pruning using decomposed quantization and learnable gates, such as Bayesian gates, suitable for implementing various embodiments. In some embodiments, the learnable gates may be stochastic gates. With reference to FIGS. 1 and 2, a processor 104, including an AI processor 124, may be configured to train quantization and pruning gates 308 and/or a neural network 312.

The quantization and pruning gates 308 may be trained and used to train a neural network 312 to reduce the computational load of the neural network 312 while maintaining a range of accuracy for the computations of the neural network 312. Data may be used to learn the values of each gate (e.g., gate 204a, 204b, 204c, 204d, 204e) to achieve a target balance between efficiency (in terms of lower bit-widths resulting from fewer gates selected for combination) and accuracy (in terms of higher bit-widths resulting from more gates selected for combination). To manage the balance between efficiency and accuracy, a regularizer, such as a Bayesian regularizer or principled regularizer, may be used to favor efficient models. A tunable hyperparameter may be used to control a strength of the regularizer, controlling the balance between efficiency and accuracy. In some embodiments, the regularizer may be configured to reduce computational complexity of the neural network 312. In some embodiments, the regularizer may be configured to reduce other metrics of the neural network 312, such as computational latency. In some embodiments, the regularizer may be configured to encourage gate configurations that prefer efficient neural networks.

As such, a prior probability of each gate may be a discrete probability distribution. For example, the prior probability of each gate may be a Bernoulli distribution in which the prior probability $p(Z_b=1)$=Bernoulli($\pi_b$) for each gate $Z_b$. The prior probability may be chosen to encourage training neural network computational efficiency, such as reducing the computational load of the neural network 312, as discussed further herein. In some embodiments, the prior probability may favor low bit-width configurations of the neural network 312.

Additionally, a variational approximation to the posterior gate probabilities 316 from the neural network output 314 resulting from implementation of the quantization and pruning gates 308 may be used. The variational approximation may generate an autoregressive distribution configured such that a probability of a gate being selected for combination may depend on values of all previous (lower bit-width) gates. The autoregressive distribution may be configured to ensure that a gate may be selected for combination in conjunction with all previous gates. Each quantizer has its own posterior distribution over the gates. In other words, the variational approximation may be configured to ensure that when a gate of a certain bit-width is not selected for combination, then the gates of greater bit-width are also not selected for combination. In this manner, valid bit-width settings resulting from gate selection may be ensured. For example, without applying the variational approximation, if gate $Z_b$ is not selected for combination and gate $Z_{2b}$ is selected for combination, the necessary bit-width for the tensor on which the gates are applied would be $2b$, despite the quantization and pruning gates 308 being configured to generate a smaller bit-width output. In some embodiments, the variational approximation may be an autoregressive variational approximation $q_\Phi(Z)$ to the posterior gate probabilities 316, for which:

$$q_\Phi(Z) = \Pi_{b=2,4,8,\ldots} q_{\Phi b}(Z_b | Z_{b' < b})$$

where $\Phi = \{\Phi_2, \ldots, \Phi_B\}$ and $Z = \{Z_2, \ldots, Z_b\}$ where B is the available bit-widths of the quantization and pruning gates 308.

The quantization and pruning gates 308 may be configured to receive a data set, or input tensor 302 (D), and apply the computations for the quantization and pruning gates 308 to the input tensor 302. The input tensor 302 may include weight and/or activation values. Each gate of the quantization and pruning gates 308 may be parameterized by a parameter $\Phi_{T,b}$, where "T" is the tensor to which the quantizer is applied and "b" is the gate bit-width. In a forward pass, a gate value for each gate may sampled according to its approximate posterior probability. This may yield a bit-width for each input tensor 302, such as weight and activation tensors, to which the weight input tensors 302 may be quantized, using a decomposed quantization procedure as described further herein, to produce quantized tensors 310, which may also be referred to as a gated tensor. The quantized tensors 310 may be used to compute the neural network's output 314.

The quantization and pruning gates 308 may be further configured with parameters configured to control the balance between efficiency and accuracy based on a reconstruction term 304 and a complexity term 306. The reconstruction 304 may be configured to effect predictive performance for targets given the input tensor 302. The complexity term 306 may be configured to regularize the variational posterior distribution to be as close to the prior probability. The parameter terms 304, 306 may be set for the quantization and pruning gates 308 to produce a quantized tensor 310 such that when input to the neural network 312 for training, the neural network 312 is trained for implementing computations with a specified combination of accuracy and complexity. The quantized tensor 310 may be quantized and/or pruned by the quantization and pruning gates 308. In some embodiments, the parameter terms 304, 306 may be set for the quantization and pruning gates 308 for training the neural network 312 for target latency. The parameter terms 304, 306 may be set as directed by a user and/or as learned through training. The parameter terms 304, 306 may be learned to satisfy the variational objective of maximizing the following lower bound to the marginal likelihood $p_\theta$ (D):

$$\mathcal{L}(\theta, \Phi) = \mathbb{E}_{q_\phi(Z)}[\log p_\theta(D|Z)] - KL(q_\Phi(Z) \| p(Z))$$

where $\theta$ may be parameters of the neural network 312. The reconstruction term 304:

$$\mathbb{E}_{q_\phi(Z)}[\log p_\theta(D|Z)]$$

favors neural networks with high accuracy in terms of predictive performance for the targets given the input tensor 302. The complexity term 306:

$$KL(q_\Phi(Z) \| p(Z))$$

favors efficient neural networks through aiming to regularize the variational posterior distribution to be as close as possible to the prior probability p(Z).

In some embodiments, the parameter terms 304, 306 may be jointly trained with the weights of a model, which may require large amounts of data and long training times. In some embodiments mixed-precision quantization and structured pruning using decomposed quantization and learnable gates, such as Bayesian gates, may be applied on a previously trained model, in which case the trained model weights may be kept fixed and a much smaller dataset may be used to train the parameter terms 304, 306.

Given certain assumptions, the complexity term 306 may be reduced. Such assumptions may include, for example, that the neural network 312 is trained using large amounts of data and that the prior probability has a very high probability of p(Z)=0. With such assumptions, the complexity term 306 may be reduced to:

$$KL(q_\phi(Z) \| p(Z)) = \lambda \sum_{b=2,4,8,\ldots} \prod_{i \leq b} q_\Phi(Z_i = 1 | Z_{<i} = 1)$$

where a hyperparameter $\lambda$ is a function of the prior probability p(Z). As such, the complexity term 306 is computed based on the gate parameters $\Phi$ and summed over all gates. Modifying the hyperparameter $\lambda$ adjusts the strength of the regularization imposed by the complexity term 306.

In an example, multiplier-accumulator (MAC) counts may be used as a factor for managing compute efficiency and accuracy of the neural network 312. To reduce a level of compute executed by the neural network 312, operations that have higher MAC counts should be more strongly encouraged to be pruned and/or performed in low bit-width than lower MAC count operations. To ensure higher MAC count operations are pruned and/or performed in low bit-width, the gates trained for the layers of the neural network 312 with the higher MAC count operations may be assigned lower prior probabilities so that they are less likely to be selected for combination. The hyperparameter $\lambda$ may be set for any individual layer L and bit-width b as:

$$\lambda_{b,L} = \lambda \cdot b \cdot MAC(L)$$

where MAC(L) is the MAC count for the layer L. The hyperparameter $\lambda$ is a global hyperparameter shared by all layers of the neural network 312. Trade-offs between computational efficiency and accuracy may be fine-tuned by adjusting the hyperparameter λ without needing to fine-tune a hyperparameter for individual layers. Setting the hyperparameter λ for a specific layer L may allow for more controlled regularization of the layer L.

In the case of higher MAC count layers, the regularization of the layers may be stronger than the regularization of lower MAC count layers. In some embodiments, other factors for managing compute efficiency and accuracy of the neural network 312 may supplement and/or replace MAC count, such as timing and/or energy user information from the neural network 312 run on hardware and/or hardware simulators. This may allow the neural network 312 to be trained using the quantization and pruning gates 308 in an environment that reflects an environment in which the neural network 312 may be implemented, which may be used to accurately set hardware-realistic prior probabilities and/or regularization factors, such as the parameter terms 304, 306.

The quantization and pruning gates 308 may be trained using gradient-based optimization. Loss values may be calculated as the sum of the reconstruction term 304 and the complexity term 306. A gradient of the loss values may be calculated with respect to the neural network parameters θ and gate parameters Φ. The gradient of the loss values may be used to update the neural network parameters θ and gate parameters Φ.

Figure 4:
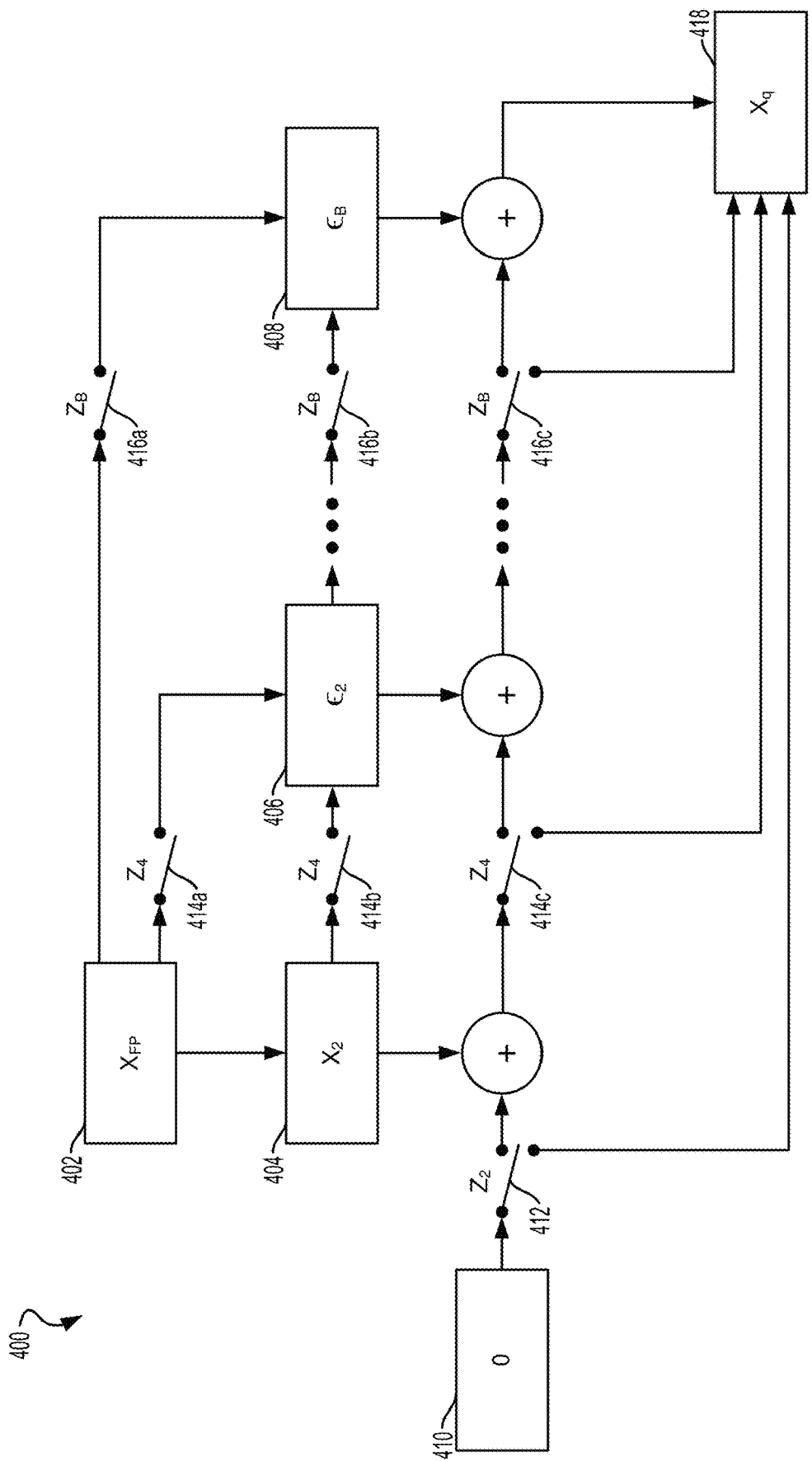
FIG. 4 is a flow diagram illustrating an example of decomposed quantization suitable for implementing various embodiments.

FIG. 4 illustrates an example of a decomposed quantization process suitable for implementing various embodiments. With reference to FIGS. 1-3, a processor 104, such as an AI processor 124, may be configured to implement decomposed quantization 400 by quantization and pruning gates 308 for use in generating a quantized tensor 310 for input to a neural network 312.

A decomposed quantization process 400 may include receiving a tensor 402 ($x_{FP}$, which may be a floating point tensor) (e.g., input tensor 302). The tensor 402 may be clipped to a range of values [α,β], which may be a fixed and/or learned range of values. Clipping the tensor 402 may produce a clipped tensor (not shown) such that all values of the tensor 402 are within the range of values [α,β]. Any value of the tensor 402 outside of the range of values [α,β] may be set to the values at the limits of the range of values. For example, values of the tensor 402 below a lower limit value of the range of values (α) may be set to the lower limit value, and values of the tensor 402 above a higher limit value of the range of values (β) may be set to the higher limit value. The clipped tensor may be quantized to a lowest bit-width, such as 2 bits, which may be a smallest bit width that a hardware for implementing a neural network may be configured to process. Quantizing the clipped tensor may produce a quantized tensor 404 ($x_2$) of the lowest bit-width using a scale ($s_2$) of the lowest bit-width:

$$x_2 = s_2 \left\lfloor \frac{x_{FP}}{s_2} \right\rceil; s_2 = \frac{\beta - \alpha}{2^b - 1}$$

In some embodiments, the progression of iterative calculation of quantized residual error tensors 406, 408 may be subject to selective control of gates 412, 414a, 414b, 414c, 416a, 416b, 416c ($Z_b$) (e.g., gates 204a, 204b, 204c, 204d, 204e). The gates 412, 414a, 414b, 414c, 416a, 416b, 416c may be selected for combination or for output. In some embodiments, the values of the gates may be binary values, such as "1" for gates selected for combination and "0" for gates selected for output. The gate values may be calculated by quantization and pruning gates (e.g., quantization and pruning gates 308) trained to determine a probability distribution value for each of the available gates 412, 414a, 414b, 414c, 416a, 416b, 416c based on various parameters, such as the tensor and/or any combination of hyperparameters (e.g., reconstruction term 304, a complexity term 306 in FIG. 3). Gates 412, 414a, 414b, 414c, 416a, 416b, 416c selected for combination may enable the iterative calculation of quantized residual error tensors 406, 408 up to the bit-width of the highest bit-width value gate 416a, 416b, 416c selected for combination. Gates 414a, 414b, 414c, 416a, 416b, 416c selected for output may enable output of a sum of values at all of the gates 412, 414c, 416c selected for combination.

A residual error tensor of quantization at a bit-width ($\epsilon_b$), such as a bit-width of b/2, may be iteratively quantized to a next higher bit-width, such as b, for each higher bit-width until a highest bit-width (B). The residual error tensor may be quantized using a scale ($s_b$) for the next higher bit-width:

$$x_b = x_{b/2} + \epsilon_b; \epsilon_b = s_b \left\lfloor \frac{x_{FP} - x_{b/2}}{s_b} \right\rceil; s_b = \frac{s_{b/2}}{2^{b/2} + 1}$$

For example, the residual error tensor of quantizing the clipped tensor to the lowest bit-width may be quantized using the scale for the next higher bit-width, producing a quantized residual error tensor 406 ($\epsilon_4$). The iterations may continue until producing a quantized residual error tensor 408 ($\epsilon_B$) for the highest bit-width B. Each iteration of the quantization may double the bit-width, which may produce values of bit-widths that are compliant with hardware designs based on a lowest bit-width that is a power of two, such as 2 bits.

A value may be calculated at each gate 412, 414c, 416c. In some embodiments, such as for a decomposed quantization process 400 configured for weight tensors, a value at a gate 412 ($Z_2$) may be a constant value 410, such as a value that may represent no value, for example "0". The value at the gate 414c ($Z_4$) may be the value of the quantized tensor 404 of the lowest bit-width. In some embodiments, such as for a decomposed quantization process 400 configured for weight tensors, the gate 414c may be a next higher bit-width gate in relation to the gate 412 and the value at the gate 414c may be the sum of the constant value 410 and the quantized tensor 404 of the lowest bit-width. In some embodiments, such as for a decomposed quantization process 400 configured for activation tensors, the value at the gate 414c may be the quantized tensor 404 of the lowest bit-width.

The value at the higher bit-width gates 416c ($Z_b$) may be calculated by adding each of the values at the lower bit-width gates 412, 414c and the iteration results of the lower bit-widths. Stated differently, the values, such as quantized tensors, at the higher bit-width gates 416c may be calculated by adding the value, such as a quantized tensor, at the next lower bit-width gate and the iteration result, such as the quantized residual error tensor, of the next lower bit-width. For example, the value at gate 416c may be the sum of the quantized tensor 404 at gate 414c and the quantized residual error tensor 406 ($\epsilon_4$). In some embodiments, the gates 412, 414a, 414b, 414c of lower bit-width than the gate 416c selected for output may be gates 412, 414a, 414b, 414c selected for combination enabling summation of the values at the gates 412, 414a, 414b, 414c selected for combination. In some embodiments, whether the constant value 410 at gate 412 is included in the sum of a higher bit-width gate 416c may depend on whether the decomposed quantization process 400 is configured for weight tensors or activation tensors.

A quantized tensor 418 ($x_q$) (e.g., quantized tensor 310 in FIG. 3) may be produced from the summation of the quantized tensor 404 of the lowest bit-width and the iteration results, such as the quantized residual error tensors 406, 408, of the lower bit-widths than the bit-width b of the gate 412, 414c, 416c selected for output:

$$x_q = Z_2(x_2 + Z_4(\epsilon_4 + \ldots ( \ldots + Z_{b/2}(\epsilon_{b/2} + Z_b \cdot \epsilon_b))))$$

In some embodiments, such as for the decomposed quantization process 400 configured for activation tensors, gate $Z_2$ may be omitted or the value of gate $Z_2$ may be set to "1". The quantized tensor 418 may be output by the quantization and pruning gates as a quantized tensor 310 for input to a neural network, as illustrated in FIG. 3.

Figure 5:
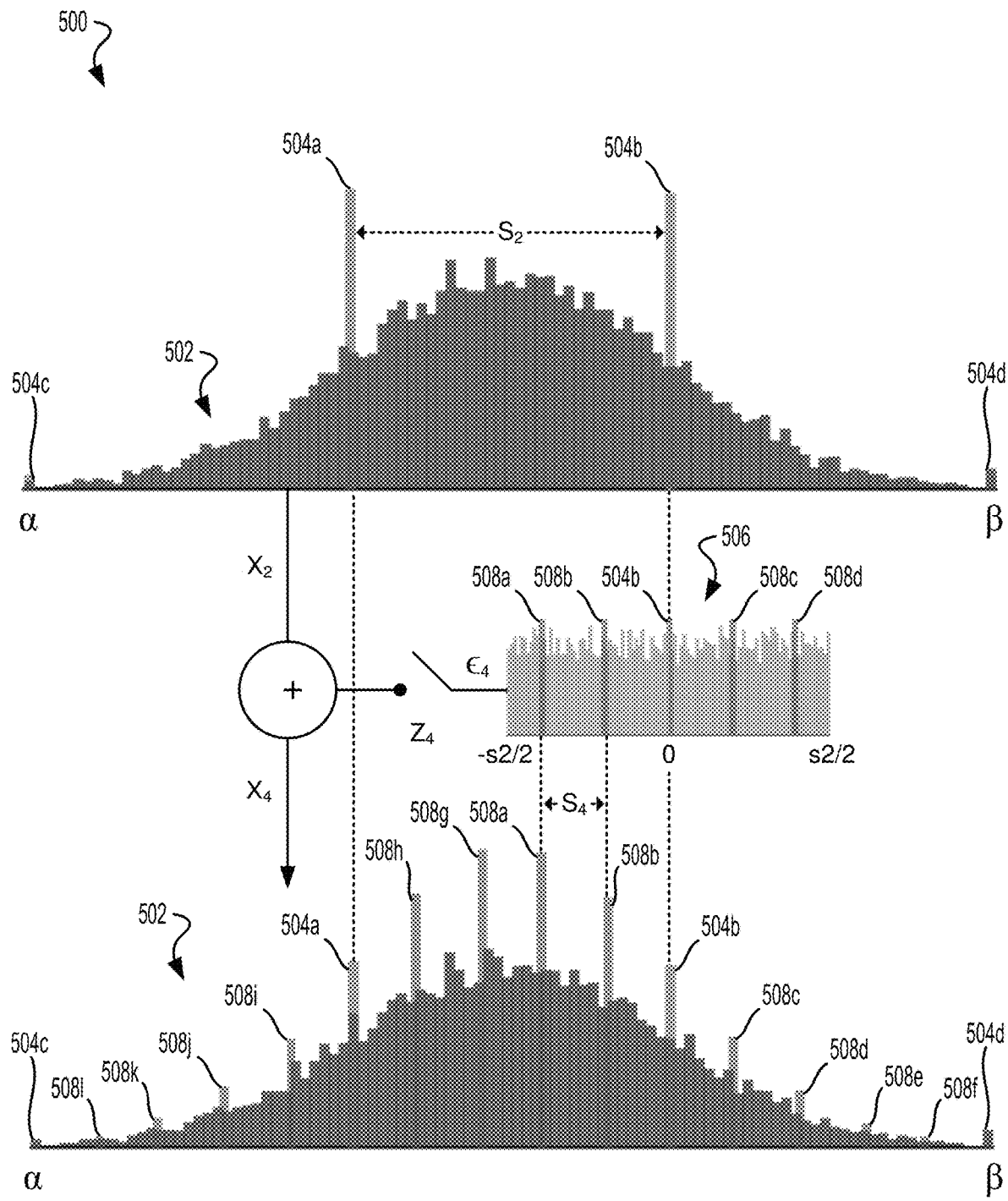
FIG. 5 is a flow and graph diagram illustrating an example of decomposed quantization suitable for implementing various embodiments.

FIG. 5 illustrates an example of decomposed quantization suitable for implementing various embodiments. With reference to FIGS. 1-4, the example illustrated in FIG. 5 includes a detailed illustration of the quantization of residual error to a quantized residual error tensor and calculation of a quantized tensor of a next higher bit-width and of a decomposed quantization process 500 (e.g., decomposed quantization process 400). Specifically, this example illustrates quantization of the residual error of the quantized tensor 404 ($x_2$) to the quantized residual error tensor 406 ($\epsilon_4$) and calculation of a quantized tensor ($x_4$). This description using the quantized tensor 404 ($x_2$), the quantized residual error tensor 406 ($\epsilon_4$), and the quantized tensor ($x_4$) is for illustrative purposes only and is not meant to limit the scope of the claims or the description, and some or all of the descriptions of this example may be applicable to any pair of residual error and quantized residual error tensor of a next higher bit-width.

A tensor 502 (which may be a floating point tensor) (e.g., input tensor 302, tensor 402) may be clipped to a fixed or learned range [$\alpha, \beta$] and quantized to a 2-bit quantized tensor ($x_2$) having quantized tensor grid points 504a, 504b, 504c, 504d. The quantization of the tensor 502 producing the 2-bit quantized tensor may use the scale ($s_2$) spacing the quantized tensor grid points 504a, 504b, 504c, 504d:

$$s_2 = \frac{\beta - \alpha}{2^2 - 1}$$

A residual error 506 for quantizing the tensor 502 may be calculated by subtracting the 2-bit quantized tensor from the tensor 502. The residual error 506 may be quantized using a next higher bit-width, such as 4 bits, and quantized to a 4-bit residual error quantized tensor ($\epsilon_4$) having quantized tensor grid points 504b, 508a, 508b, 508c, 508d. The quantization of the residual error 506 producing the 4-bit residual error quantized tensor may use a scale ($s_4$) spacing the quantized tensor grid points 504b, 508a, 508b, 508c, 508d:

$$s_4 = \frac{s_2}{2^2 + 1} = \frac{\beta - \alpha}{(2^2 + 1)(2^2 - 1)} = \frac{\beta - \alpha}{2^4 - 1}$$

The 4-bit residual error quantized tensor and the 2-bit quantized tensor may be added to produce a 4-bit quantized tensor ($x_4$) having quantized tensor grid points 504a, 504b, 504c, 504d, 508a, 508b, 508c, 508d, 508e, 508f, 508g, 508h, 508i, 508j, 508k, 508l.

A next quantization and addition (not shown) may be performed, doubling the bit-width of the 4-bit quantized tensor to produce an 8-bit quantized tensor ($x_8$). A residual error for quantizing the 4-bit residual error quantized tensor may be calculated by subtracting the 4-bit quantized tensor from the tensor 502. The residual error for quantizing the 4-bit residual error quantized tensor may be quantized using the 8 bit bit-width, and quantized to an 8-bit residual error quantized tensor ($\epsilon_8$), using a scale ($s_8$) spacing quantized tensor grid points:

$$s_8 = \frac{s_4}{2^4 + 1}$$

The 8-bit residual error quantized tensor and the 4-bit quantized tensor may be added to produce the 8-bit quantized tensor. This process may be iteratively repeated, doubling the bit-width of the current quantized tensor to the next higher bit quantized tensor in each iteration.

Figure 6:
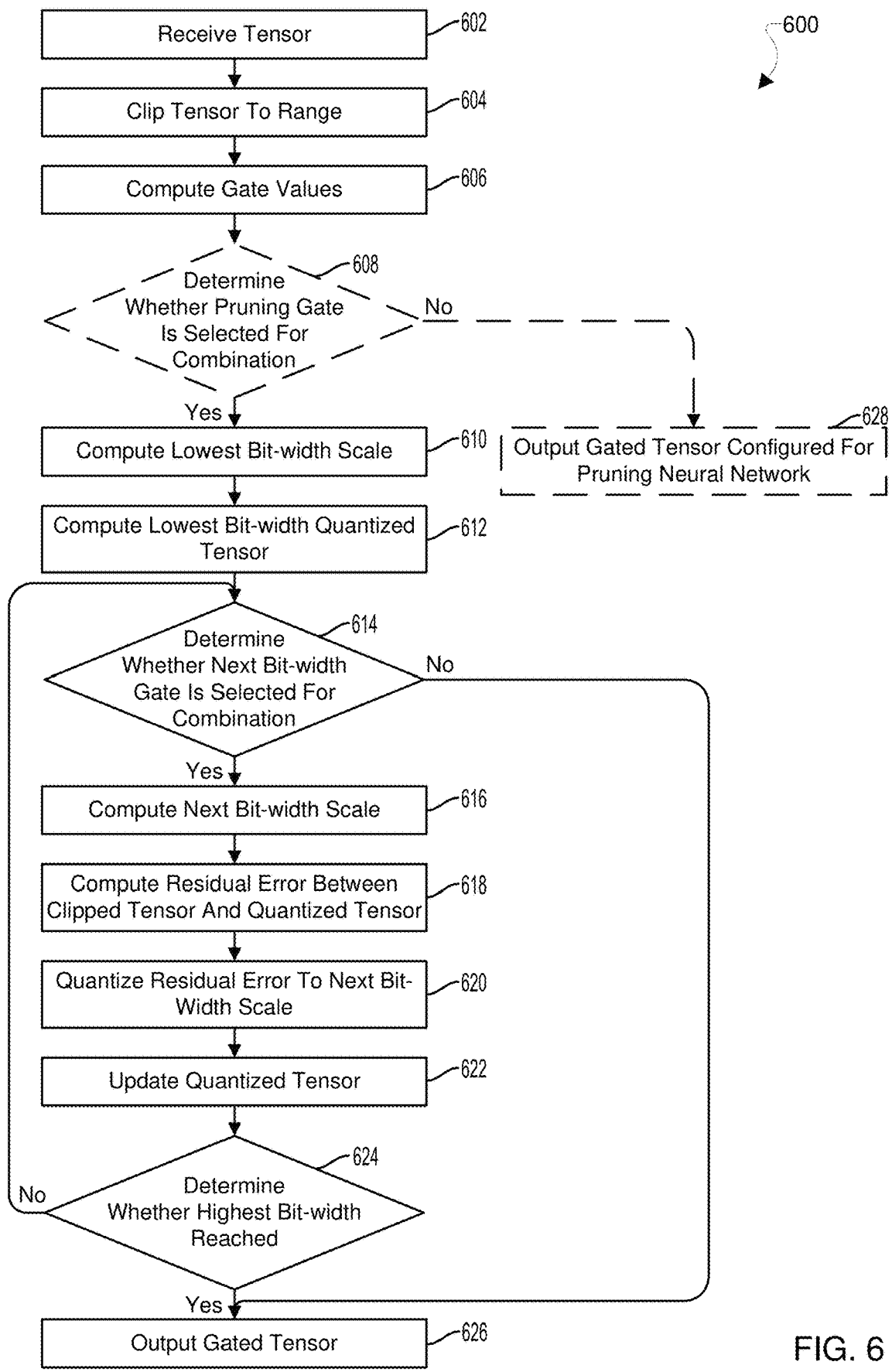
FIG. 6 is a process flow diagram illustrating a method for mixed-precision quantization and structured pruning using decomposed quantization and learnable gates, such as Bayesian gates, according to an embodiment

FIG. 6 illustrates a method 600 for mixed-precision quantization and structured pruning using decomposed quantization and learnable gates, such as Bayesian gates, according to an embodiment. In some embodiments, the learnable gates may be stochastic gates. With reference to FIGS. 1-6, the method 600 may be implemented in a computing device (e.g., computing device 100 in FIG. 1), in general purpose hardware, in dedicated hardware, in software executing in a processor (e.g., processor 104 or AI processor 124 in FIG. 1), or in a combination of a software-configured processor and dedicated hardware. For example, the method 600 may be implemented as a processor (e.g., processor 104, AI processor 124 in FIG. 1) executing software within a mixed-precision quantization and structured pruning system (e.g., system 300 in FIG. 3, or the decomposed quantization process 400, 500 in FIGS. 4 and 5) that includes other individual components, and various memory/cache controllers. In order to encompass the alternative configurations enabled in various embodiments, the hardware implementing the method 600 is referred to herein as an "processing device."

In block 602, the processing device may receive a tensor (e.g., input tensor 302 in FIG. 3, tensor 402 in FIG. 4). The tensor may include activation and/or weight values. In some embodiments, the tensor may include floating point values. In some embodiments, the processing device receiving the tensor in block 602 may be a processor, such as an AI processor.

In block 604, the processing device may clip the tensor to a range of values [$\alpha, \beta$] (e.g., tensor 502 in FIG. 5). The values in the tensor may be clipped such that all values of the tensor are within the range of values. Any value of the tensor outside of the range of values may be set to the values at the limits of the range of values. For example, values of the tensor below a lower limit value of the range of values ($\alpha$) may be set to the lower limit value, and values of the tensor above a higher limit value of the range of values ($\beta$) may be set to the higher limit value. In some embodiments, the processing device clipping the tensor to the range of values in block 604 may be the processor, such as the AI processor.

In block 606, the processing device may compute values of gates (e.g., gate 204a, 204b, 204c, 204d, 204e in FIG. 2, gate 412, 414a, 414b, 414c, 416a, 416b, 416c in FIG. 4) of a decomposed quantization process (e.g., decomposed quantization process 400 in FIG. 4). The value of each gate may indicate whether a gate is selected for combination or selected for output (or not selected for combination). In some embodiments, the values of the gates may be binary values, such as "1" for gates selected for combination and "0" for gates selected for output. The gate values may be calculated by quantization and pruning gates (e.g., quantization and pruning gates 308) trained to determine a probability distribution value for each of the available gates based on various parameters, such as the tensor and/or any combination of hyperparameters (e.g., reconstruction term 304, a complexity term 306 in FIG. 3). In some embodiments, the quantization and pruning gates may be trained to determine a highest probability distribution value for a gate from among all available gates for which the highest probability distribution value represents an improvement in computational complexity and/or accuracy for a neural network (e.g., neural network 312 in FIG. 3) implemented using a quantized tensor (e.g., quantized tensor 310 in FIG. 3, quantized tensor 418 in FIG. 4) output by the quantization and pruning gates. The gate with the highest probability distribution value and all lower bit-width gates may be selected for combination, such as being assigned the value of "1." Otherwise, the gates may be selected for output, such as being assigned the value of "0." In some embodiments, the processing device computing the values of the gates of the decomposed quantization process in block 606 may be the processor, such as the AI processor.

In optional determination block 608, the processing device may determine whether a lowest bit-width gate (e.g., gate 204a in FIG. 2, gate 412 in FIG. 4) is selected for combination. In some embodiments, the lowest bit-width gate may be selected for combination based on a highest probability distribution value for the lowest bit-width gate from among all available gates. In some embodiments, the lowest bit-width gate may be selected for combination based on being a lower bit-width than the gate having the highest probability distribution value. As such, in some embodiments, the lowest bit-width gate may be assigned a value of "1" in block 606. Otherwise, the lowest bit-width gate may be selected for output (or not selected for combination). As such, in some embodiments, the lowest bit-width gate may be assigned a value of "0" in block 606. In some embodiments, determining whether the lowest bit-width gate is selected for combination may be based on the value of the lowest bit-width gate. As discussed herein, the lowest bit-width gate may be used in a decomposed quantization process configured for weight tensors, and may not be used in a decomposed quantization process configured for activation tensors. In some embodiments, the processing device determining whether the lowest bit-width gate is selected for combination in optional determination block 608 may be the processor, such as the AI processor.

In response to determining that the lowest bit-width gate is not selected for combination (i.e., optional determination block 608="No"), the processing device may output a quantized tensor configured for pruning a neural network in optional block 628. The quantized tensor may include a value configured to represent no value, such as zero (0), when used by the neural network as a tensor value takes the place of an activation and/or weight value, effectively resulting in no operation and/or no value for the replaced activation and/or weight value. As such, the replaced activation and/or weight value and/or an output channel of the neural network (e.g., output channel 202a, 202b, 202c, 202d in FIG. 2) using the replaced activation and/or weight value are effectively pruned from the neural network, such as removed or shut off. In some embodiments, the processing device outputting the quantized tensor configured for pruning the neural network in optional block 628 may be the processor, such as the AI processor.

Following computing values of gates of the decomposed quantization process in block 606, or in response to determining that the lowest bit-width gate is selected for combination (i.e., optional determination block 608="Yes"), the processing device may compute a lowest bit-width scale in block 610. As described herein, the lowest bit-width scale may be calculated based the range of values [α,β] to which the tensor received in block 602 is clipped in block 604, and based on the lowest bit-width. Also as described herein, the lowest-bit width may be a smallest bit-width for which a computer hardware is configured to process, such as 2 bits. In some embodiments, the processing device computing the lowest bit-width scale in block 610 may be the processor, such as the AI processor.

In block 612, the processing device may compute a lowest-bit width quantized tensor (e.g., quantized tensor 404 in FIG. 4, or tensor 502 in FIG. 5). As described herein, the processing device may quantize the clipped tensor, resulting from clipping the tensor in block 604, to the lowest bit-width scale calculated in block 610. For example, consider having an input that is quantized with a uniform quantizer with an associated bit-width b, where the step-size of the quantizer depends on the bit-width b. A quantization of the clipped tensor using a lowest bit-width, such as b=2, may be implemented with the selection of the gate generating a 2 bit-width quantized tensor. In some embodiments, the processing device computing the lowest-bit width quantized tensor in block 612 may be the processor, such as the AI processor. In determination block 614, the processing device may determine whether a next bit-width gate (e.g., gate 204a, 204b, 204c, 204d, 204e in FIG. 2, or gate 414c, 416c in FIG. 4) is selected for combination. In embodiments including the lowest bit-width gate, the next bit-width gate may be a next higher bit-width gate from the lowest bit-width gate. In embodiments not including the lowest bit-width gate, the next bit-width gate may be a bit-width gate of a next bit-width higher than the lowest bit-width. In subsequent iterations of determination block 614, the next bit-width gate may be a next higher bit-width gate from the previous next bit-width gate. In some embodiments, the next bit-width gate may have a bit-width double the bit-width of a next lower bit-width. The next bit-width gate may be selected for combination in a similar manner as described for optional determination block 608 for the lowest bit-width gate. In some embodiments, the processing device determining whether the next bit-width gate is selected for combination in determination block 614 may be the processor, such as the AI processor.

In response to determining that the next bit-width gate is selected for combination (i.e., determination block 614="Yes"), the processing device may compute a next bit-width scale in block 616. As discussed herein, the next bit-width scale may be calculated based on a previous bit-width scale. In some embodiments, the previous bit-width scale may be the lowest bit-width scale calculated in block 610. In some embodiments, the previous bit-width scale may be a next lower bit-width scale calculated in a previous iteration of block 616. In some embodiments, the next bit-width scale may be double the bit-width of the previous bit-width scale. In some embodiments, the processing device computing the next bit-width scale in block 616 may be the processor, such as the AI processor.

In block 618, the processing device may compute a residual error between the clipped tensor, as produced in block 604, and a quantized tensor. The processing device may determine the residual error by subtracting the quantized tensor from the clipped tensor. In some embodiments, the quantized tensor may be the lowest bit-width quantized tensor calculated in block 612. In some embodiments, the quantized tensor may be the quantized tensor calculated in a previous iteration of block 622, as described herein. The quantized tensor may have a bit-width equal to that of the gate selected for combination, such as the bit-width of the gate in determination block 614. In some embodiments, the processing device computing the residual error between the clipped tensor and the quantized tensor in block 618 may be the processor, such as the AI processor.

In block 620, the processing device may quantize the residual error of the quantized tensor, as calculated in block 618, to the next bit-width scale, as calculated in block 616. Quantizing the residual error to the next highest bit-width scale may produce a residual error quantized tensor of the bit-width scale. In some embodiments, quantizing the residual error to the next highest bit-width scale may include quantizing the residual error to a bit-width double the bit-width of the quantized tensor used to calculate the residual error in block 618. The next highest bit-width scale to which to quantize the residual error may also be the bit-width of the gate selected for combination, such as the bit-width of the gate in determination block 614. In some embodiments, the processing device quantizing the residual error of the quantized tensor to the next bit-width scale in block 620 may be the processor, such as the AI processor.

In block 622, the processing device may update the quantized tensor. Updating the quantized tensor may include adding a previous quantized tensor and a residual error quantized tensor calculated in block 620. In some embodiments, the quantized tensor may be the lowest bit-width quantized tensor calculated in block 612. In some embodiments, the quantized tensor may be a quantized tensor updated in a previous iteration of block 622. The updated quantized tensor may have a bit-width of the gate selected for combination, such as the bit-width of the gate in determination block 614. Similarly, the updated quantized tensor may have a bit-width of the next bit-width scale calculated in block 616. For example, a higher bit-width quantization may be achieved by adding a quantized residual error of a previous quantization to the previous quantized tensor to generate a next quantized tensor. Continuing with the example, the quantized residual error of the initial quantization of the tensor using a 2 bit-width may be added to the 2 bit-width quantized tensor implemented with the selection of a next gate for a next bit-width, such as b=4, generating a 4 bit-width quantized tensor. This example may be generalized to an arbitrary power of 2 bit-widths by sequentially doubling the precision of the quantized tensor through the addition of the, quantized, remaining residual error with selection of sequential gates. In some embodiments, the processing device updating the quantized tensor in block 622 may be the processor, such as the AI processor.

In determination block 624, the processing device may determine whether a highest bit-width is reached. In some embodiments, the highest bit-width may be a set value and reaching the highest bit-width may be determined by the bit-width of the gate selected for combination, such as the bit-width of the gate in determination block 614, the next bit-width scale as calculated in block 616, the residual error quantized tensor as calculated in block 620, and/or the quantized tensor as calculated in block 622 being the highest bit-width. In some embodiments, the processing device determining whether the highest bit-width is reached in block 624 may be the processor, such as the AI processor.

In response to determining that a highest bit-width is not reached (i.e., determination block 624="No"), the processing device may determine whether a next bit-width gate is selected for combination in determination block 614. In some embodiments, the processing device determining whether the next bit-width gate is selected for combination in determination block 614 may be the processor, such as the AI processor.

In response to determining that the next bit-width gate is not selected for combination (i.e., determination block 614="No"), or in response to determining that a highest bit-width is reached (i.e., determination block 624="Yes"), the processing device may output a quantized tensor in block 626. In some embodiments, in response to determining that the next bit-width gate is not selected for combination, the processing device may output the lowest bit-width quantized tensor calculated in block 612 as the quantized tensor. In response to one of the gates not being selected, the addition of all of the higher bit-width quantized, remaining residual errors may be avoided, thus controlling the bit-width of the quantized tensor. In some embodiments, in response to determining that the next bit-width gate is not selected for combination, the processing device may output the quantized tensor calculated in block 622 as the quantized tensor. In response to determining that a highest bit-width is reached, the processing device may output the quantized tensor calculated in block 622 as the quantized tensor. In some embodiments, the processing device outputting the quantized tensor in block 626 may be the processor, such as the AI processor.

Figure 7:
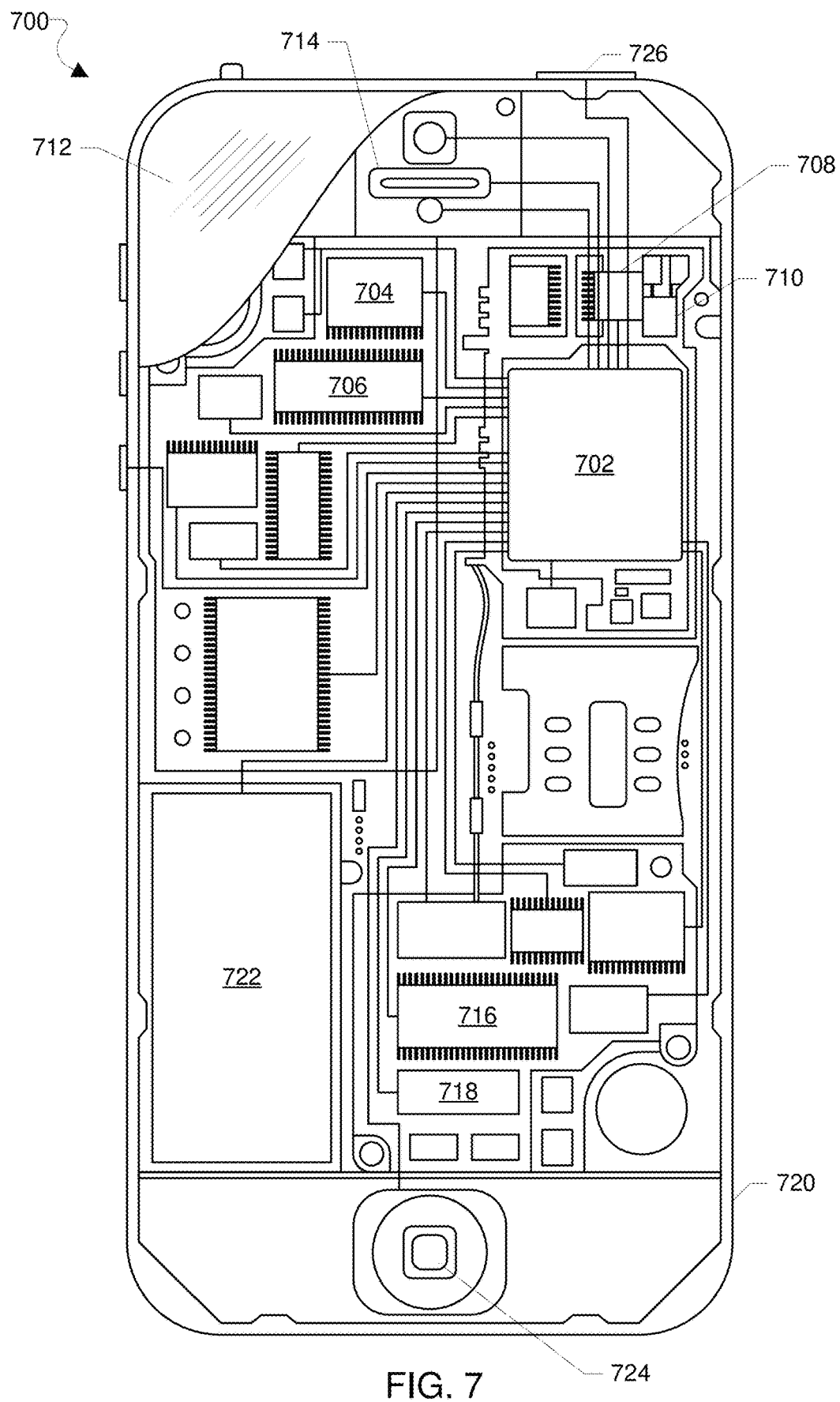
FIG. 7 is a component block diagram illustrating an example mobile computing device suitable for implementing an artificial intelligence (AI) processor in accordance with the various embodiments.

Methods and devices for implementing such methods in accordance with the various embodiments (including, but not limited to, embodiments described above with reference to FIGS. 1-6) may be implemented in a wide variety of computing systems including mobile computing devices, an example of which suitable for use with the various embodiments is illustrated in FIG. 7. The mobile computing device 700 may include a processor 702 coupled to a touchscreen controller 704 and an internal memory 706. The processor 702 may be one or more multicore integrated circuits designated for general or specific processing tasks. The internal memory 706 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the mobile computing device 700 need not have touch screen capability.

The mobile computing device 700 may have one or more radio signal transceivers 708 (e.g., Peanut, Bluetooth, ZigBee, Wi-Fi, RF radio) and antennae 710, for sending and receiving communications, coupled to each other and/or to the processor 702. The transceivers 708 and antennae 710 may be used with the above-mentioned circuitry to implement the various wireless transmission protocol stacks and interfaces. The mobile computing device 700 may include a cellular network wireless modem chip 716 that enables communication via a cellular network and is coupled to the processor.

The mobile computing device 700 may include a peripheral device connection interface 718 coupled to the processor 702. The peripheral device connection interface 718 may be singularly configured to accept one type of connection, or may be configured to accept various types of physical and communication connections, common or proprietary, such as Universal Serial Bus (USB), FireWire, Thunderbolt, or PCIe. The peripheral device connection interface 718 may also be coupled to a similarly configured peripheral device connection port (not shown).

The mobile computing device 700 may also include speakers 714 for providing audio outputs. The mobile computing device 700 may also include a housing 720, constructed of a plastic, metal, or a combination of materials, for containing all or some of the components described herein. The mobile computing device 700 may include a power source 722 coupled to the processor 702, such as a disposable or rechargeable battery. The rechargeable battery may also be coupled to the peripheral device connection port to receive a charging current from a source external to the mobile computing device 700. The mobile computing device 700 may also include a physical button 724 for receiving user inputs. The mobile computing device 700 may also include a power button 726 for turning the mobile computing device 700 on and off.

Figure 8:
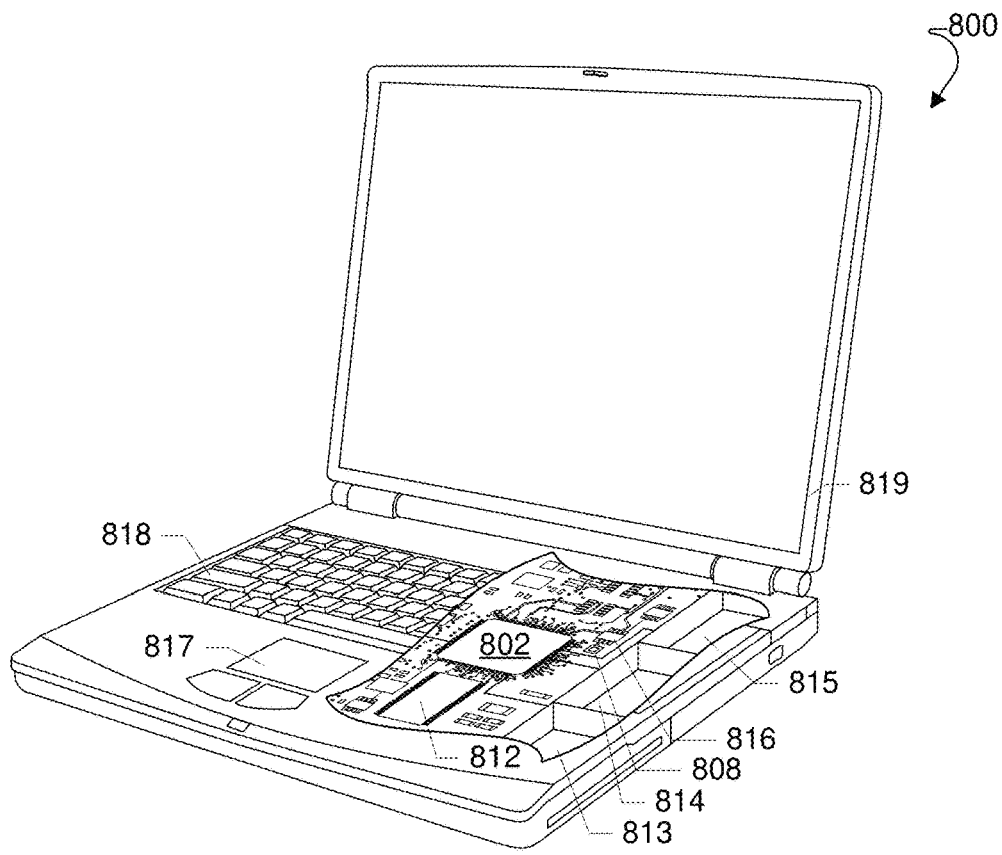
FIG. 8 is a component block diagram illustrating an example mobile computing device suitable for implementing an AI processor in accordance with the various embodiments.

Methods and devices for implementing such methods in accordance with the various embodiments (including, but not limited to, embodiments described above with reference to FIGS. 1-6) may be implemented in a wide variety of computing systems include a laptop computer 800 an example of which is illustrated in FIG. 8. A laptop computer 800 will typically include a processor 802 coupled to volatile memory 812 and a large capacity nonvolatile memory, such as a compact disc (CD) drive 813 or Flash memory. Additionally, the computer 800 may have one or more antenna 808 for sending and receiving electromagnetic radiation that may be connected to a wireless data link and/or cellular telephone transceiver 816 coupled to the processor 802. The computer 800 may also include a floppy disc drive 814 and a CD drive 813 coupled to the processor 802. In a notebook configuration, the computer housing may include a battery 815, a touchpad touch surface 817 that serves as the computer's pointing device, a keyboard 818, and a display 819 all coupled to the processor 802. Other configurations of the computing device may include a computer mouse or trackball coupled to the processor (e.g., via a USB input) as are well known, which may also be used in conjunction with the various embodiments.

Figure 9:
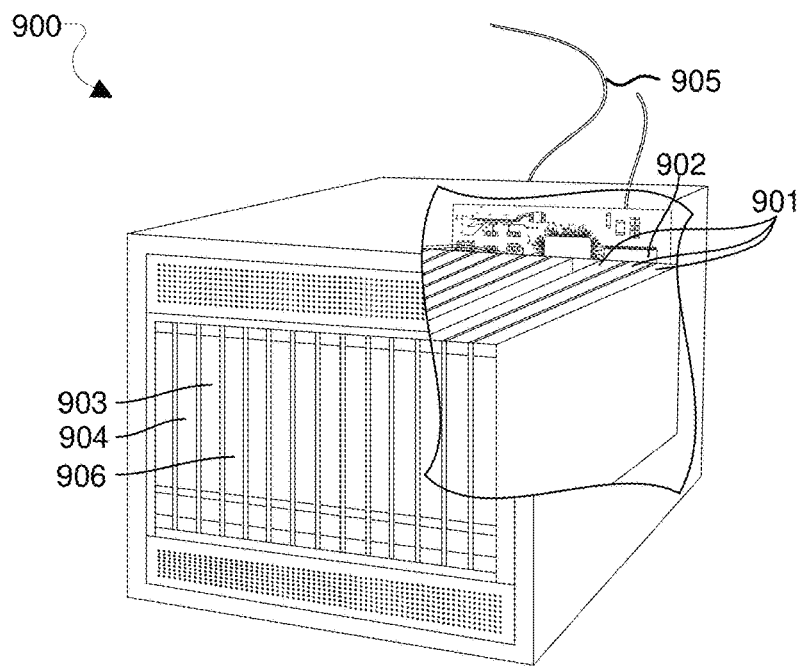
FIG. 9 is a component block diagram illustrating an example server suitable for implementing an AI processor in accordance with the various embodiments.

Methods and devices for implementing such methods in accordance with the various embodiments (including, but not limited to, embodiments described above with reference to FIGS. 1-6) may also be implemented in fixed computing systems, such as any of a variety of commercially available servers. An example server 900 is illustrated in FIG. 9. Such a server 900 typically includes one or more multicore processor assemblies 901 coupled to volatile memory 902 and a large capacity nonvolatile memory, such as a disk drive 904. As illustrated in FIG. 9, multicore processor assemblies 901 may be added to the server 900 by inserting them into the racks of the assembly. The server 900 may also include a floppy disc drive, compact disc (CD) or digital versatile disc (DVD) disc drive 906 coupled to the processor 901. The server 900 may also include network access ports 903 coupled to the multicore processor assemblies 901 for establishing network interface connections with a network 905, such as a local area network coupled to other broadcast system computers and servers, the Internet, the public switched telephone network, and/or a cellular data network (e.g., CDMA, TDMA, GSM, PCS, 3G, 4G, 5G, LTE, or any other type of cellular data network).

Implementation examples are described in the following paragraphs. While some of the following implementation examples are described in terms of example methods, further example implementations may include: the example methods discussed in the following paragraphs implemented by a computing device including a processing device configured with executable instructions to cause the processing device to perform operations of the example methods; the example methods discussed in the following paragraphs implemented by a computing device including means for performing functions of the example methods; and the example methods discussed in the following paragraphs implemented as a non-transitory processor-readable storage medium having stored thereon processor-executable instructions configured to cause a processor of a computing device to perform the operations of the example methods.

Example 1

A method for joint mixed-precision quantization and structured pruning including determining whether a plurality of gates of quantization and pruning gates are selected for combination, and in response to determining that the plurality of gates are selected for combination, iteratively for each successive gate of the plurality of gates selected for combination: quantizing a residual error of a quantized tensor to a scale of a next bit-width producing a residual error quantized tensor, in which the next bit-width increases for each successive iteration, and adding the quantized tensor and the residual error quantized tensor producing a next quantized tensor, in which the next quantized tensor has the next bit-width, and in which the next quantized tensor is the quantized tensor for a successive iteration.

Example 2

The method of example 1, further including determining whether a successive gate of the quantization and pruning gates to the plurality of gates is selected for combination, and outputting the quantized tensor of a last iteration in response to determining that the successive gate is not selected for combination.

Example 3

The method of any of examples 1 or 2, further including receiving a tensor by the quantization and pruning gates, clipping the tensor to a range of values producing a clipped tensor, and quantizing the clipped tensor to a lowest bit-width producing a clipped quantized tensor, in which quantizing a residual error of a quantized tensor to a scale of a next bit-width for a first iteration may include quantizing a residual error of the clipped quantized tensor to the scale of the next bit-width, in which the next bit-width is greater than the lowest bit-width.

Example 4

The method of any of examples 1-3, further including determining whether a gate of the quantization and pruning gates preceding the plurality of gates is selected for combination, and outputting the clipped quantized tensor in response to determining that the gate preceding the plurality of gates is not selected for combination.

Example 5

The method of example 4, in which quantizing a residual error of a quantized tensor to a scale of a next bit-width producing a residual error quantized tensor, and adding the quantized tensor and the residual error quantized tensor producing a next quantized tensor is further performed in response to determining that the gate preceding the plurality of gates is selected for combination.

Example 6

The method of any of examples 1-5, further including, in response to determining that the plurality of gates are selected for combination, iteratively for each successive gate of the plurality of gates selected for combination computing a residual error of a quantized tensor by subtracting the quantized tensor from the clipped tensor.

Example 7

The method of any of examples 1-6, further including receiving a weight tensor by the quantization and pruning gates, determining whether a gate of the quantization and pruning gates preceding the plurality of gates is selected for combination, and outputting a tensor configured to prune the weight tensor in response to determining that that the gate preceding the plurality of gates is not selected for combination.

Example 8

The method of any of examples 1-7, further including training the quantization and pruning gates using a regularizer configured to achieve a target balance of efficiency of a neural network and accuracy of the neural network by selecting fewer gates for combination producing a lower bit-width and more pruned quantized tensor favoring efficiency in comparison to selecting more gates for combination producing a higher bit-width and less pruned quantized tensor favoring accuracy.

Example 9

The method of example 8, further including setting a hyperparameter for the regularizer such that the hyperparameter strengthens regularization on a basis of an efficiency factor of the neural network.

Example 10

The method of any of examples 8 or 9, further including setting a hyperparameter for the regularizer configured to control the target balance of efficiency of a neural network and accuracy of the neural network.

Example 11

The method of any of examples 1-10, in which training the quantization and pruning gates using a regularizer includes training the quantization and pruning gates to select no gates for combination for a group of weights of a weight tensor, in which selecting no gates prunes the group of weights reducing a cost of an efficiency factor of the neural network.

Example 12

The method of any of examples 1-11, further including training the quantization and pruning gates for determining values of gates, including the plurality of gates, based on variational approximation of a posterior distribution of the quantization and pruning gates, in which the values of the gates are configured to indicate to the quantization and pruning gates whether the gates are selected for combination.

Example 13

The method of any of examples 1-12, in which quantizing a residual error of a quantized tensor to a scale of a next bit-width producing a residual error quantized tensor may include quantizing the residual error of the quantized tensor to the scale of the next bit-width producing the residual error quantized tensor, in which the next bit-width doubles for each successive iteration.

Example 14

A method for generating a mixed-precision artificial neural network may include quantizing a first layer of the mixed-precision artificial neural network at a first precision determined using corresponding stochastic gates of quantization and pruning gates, and quantizing a second layer of the mixed-precision artificial neural network at a second precision determined using corresponding stochastic gates of the quantization and pruning gates, in which the first precision and the second precision are different.

Example 15

The method of example 14, further including determining whether a plurality of stochastic gates of the quantization and pruning gates are selected for combination and in response to determining that the plurality of stochastic gates are selected for combination, iteratively for each successive stochastic gate selected for combination quantizing a residual error of a quantized tensor to a scale of a next bit-width producing a residual error quantized tensor, in which the next bit-width increases for each successive iteration, and adding the quantized tensor and the residual error quantized tensor producing a next quantized tensor, in which the next quantized tensor has the next bit-width, and in which the next quantized tensor is the quantized tensor for a successive iteration.

Example 16

The method of example 15, further including determining whether a successive stochastic gate to the plurality of stochastic gates is selected for combination, and outputting the quantized tensor of a last iteration in response to determining that the successive stochastic gate is not selected for combination.

Example 17

The method of any of examples 15-16, further including receiving a tensor by the quantization and pruning gates, clipping the tensor to a range of values producing a clipped tensor, and quantizing the clipped tensor to a lowest bit-width producing a clipped quantized tensor, in which quantizing a residual error of a quantized tensor to a scale of a next bit-width for a first iteration includes quantizing a residual error of the clipped quantized tensor to the scale of the next bit-width, in which the next bit-width is greater than the lowest bit-width.

Example 18

The method of any of examples 15-17, further including determining whether a stochastic gate of the quantization and pruning gates preceding the plurality of stochastic gates is selected for combination, and outputting the clipped quantized tensor in response to determining that the stochastic gate preceding the plurality of stochastic gates is not selected for combination.

Example 19

The method of example 18, in which quantizing a residual error of a quantized tensor to a scale of a next bit-width producing a residual error quantized tensor, and adding the quantized tensor and the residual error quantized tensor producing a next quantized tensor is further performed in response to determining that the stochastic gate preceding the plurality of stochastic gates is selected for combination.

Example 20

The method of any of examples 15-19, further including, in response to determining that the plurality of stochastic gates are selected for combination, iteratively for each successive stochastic gate of the plurality of stochastic gates selected for combination computing a residual error of a quantized tensor by subtracting the quantized tensor from the clipped tensor.

Example 21

The method of any of examples 15-20, further including receiving a weight tensor by the quantization and pruning gates, determining whether a stochastic gate of the quantization and pruning gates preceding the plurality of stochastic gates is selected for combination, and outputting a tensor configured to prune the weight tensor in response to determining that that the stochastic gate preceding the plurality of stochastic gates is not selected for combination.

Example 22

The method of any of examples 15-21, further including training the quantization and pruning gates using a regularizer configured to achieve a target balance of efficiency of a neural network and accuracy of the neural network by selecting fewer stochastic gates for combination producing a lower bit-width and more pruned quantized tensor favoring efficiency in comparison to selecting more stochastic gates for combination producing a higher bit-width and less pruned quantized tensor favoring accuracy.

Example 23

The method of example 22, further including setting a hyperparameter for the regularizer such that the hyperparameter strengthens regularization on a basis of an efficiency factor of the neural network.

Example 24

The method of any of examples 21 or 22, further including setting a hyperparameter for the regularizer configured to control the target balance of efficiency of a neural network and accuracy of the neural network.

Example 25

The method of any of examples 15-24, in which training the quantization and pruning gates using a regularizer further includes training the quantization and pruning gates to select no stochastic gates for combination for a group of weights of a weight tensor, in which selecting no stochastic gates prunes the group of weights reducing a cost of an efficiency factor of the neural network.

Example 26

The method of any of examples 15-25, further including training the quantization and pruning gates for determining values of stochastic gates, including the plurality of stochastic gates, based on variational approximation of a posterior distribution of the quantization and pruning gates, in which the values of the stochastic gates are configured to indicate to the quantization and pruning gates whether the stochastic gates are selected for combination.

Example 27

The method of any of examples 15-26, in which quantizing a residual error of a quantized tensor to a scale of a next bit-width producing a residual error quantized tensor includes quantizing the residual error of the quantized tensor to the scale of the next bit-width producing the residual error quantized tensor, in which the next bit-width doubles for each successive iteration.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method for joint mixed-precision quantization and structured pruning, comprising:
   determining whether a plurality of gates of quantization and pruning gates are selected for combination; and
   in response to determining that the plurality of gates are selected for combination, iteratively for each successive gate of the plurality of gates selected for combination:
      quantizing a residual error of a quantized tensor to a scale of a next bit-width producing a residual error quantized tensor, wherein the next bit-width increases for each successive iteration; and
      adding the quantized tensor and the residual error quantized tensor producing a next quantized tensor, wherein the next quantized tensor has the next bit-width, and wherein the next quantized tensor is the quantized tensor for a successive iteration.

2. The method of claim 1, further comprising:
   determining whether a successive gate of the quantization and pruning gates to the plurality of gates is selected for combination; and
   outputting the quantized tensor of a last iteration in response to determining that the successive gate is not selected for combination.

3. The method of claim 1, further comprising:
   receiving a tensor by the quantization and pruning gates;
   clipping the tensor to a range of values producing a clipped tensor; and
   quantizing the clipped tensor to a lowest bit-width producing a clipped quantized tensor, wherein quantizing a residual error of a quantized tensor to a scale of a next bit-width for a first iteration comprises quantizing a residual error of the clipped quantized tensor to the scale of the next bit-width, wherein the next bit-width is greater than the lowest bit-width.

4. The method of claim 3, further comprising:
   determining whether a gate of the quantization and pruning gates preceding the plurality of gates is selected for combination; and
   outputting the clipped quantized tensor in response to determining that the gate preceding the plurality of gates is not selected for combination.

5. The method of claim 4, wherein quantizing a residual error of a quantized tensor to a scale of a next bit-width producing a residual error quantized tensor, and adding the quantized tensor and the residual error quantized tensor producing a next quantized tensor is further performed in response to determining that the gate preceding the plurality of gates is selected for combination.

6. The method of claim 3, further comprising, in response to determining that the plurality of gates are selected for combination, iteratively for each successive gate of the plurality of gates selected for combination computing a residual error of a quantized tensor by subtracting the quantized tensor from the clipped tensor.

7. The method of claim 1, further comprising:
   receiving a weight tensor by the quantization and pruning gates;
   determining whether a gate of the quantization and pruning gates preceding the plurality of gates is selected for combination; and
   outputting a tensor configured to prune the weight tensor in response to determining that that the gate preceding the plurality of gates is not selected for combination.

8. The method of claim 1, further comprising training the quantization and pruning gates using a regularizer configured to achieve a target balance of efficiency of a neural network and accuracy of the neural network by selecting fewer gates for combination producing a lower bit-width and more pruned quantized tensor favoring efficiency in comparison to selecting more gates for combination producing a higher bit-width and less pruned quantized tensor favoring accuracy.

9. The method of claim 8, further comprising setting a hyperparameter for the regularizer such that the hyperparameter strengthens regularization on a basis of an efficiency factor of the neural network.

10. The method of claim 8, further comprising setting a hyperparameter for the regularizer configured to control the target balance of efficiency of a neural network and accuracy of the neural network.

11. The method of claim 8, wherein training the quantization and pruning gates using a regularizer comprises training the quantization and pruning gates to select no gates for combination for a group of weights of a weight tensor, wherein selecting no gates prunes the group of weights reducing a cost of an efficiency factor of the neural network.

12. The method of claim 1, further comprising training the quantization and pruning gates for determining values of gates, including the plurality of gates, based on variational approximation of a posterior distribution of the quantization and pruning gates, wherein the values of the gates are configured to indicate to the quantization and pruning gates whether the gates are selected for combination.

13. The method of claim 1, wherein quantizing a residual error of a quantized tensor to a scale of a next bit-width producing a residual error quantized tensor comprises quantizing the residual error of the quantized tensor to the scale of the next bit-width producing the residual error quantized tensor, wherein the next bit-width doubles for each successive iteration.

14. A computing device, comprising a processing device configured with executable instructions to cause the processing device to execute operations comprising:
 determining whether a plurality of gates of quantization and pruning gates are selected for combination; and
 in response to determining that the plurality of gates are selected for combination, iteratively for each successive gate of the plurality of gates selected for combination:
  quantizing a residual error of a quantized tensor to a scale of a next bit-width producing a residual error quantized tensor, wherein the next bit-width increases for each successive iteration; and
  adding the quantized tensor and the residual error quantized tensor producing a next quantized tensor, wherein the next quantized tensor has the next bit-width, and wherein the next quantized tensor is the quantized tensor for a successive iteration.

15. The computing device of claim 14, wherein the processing device is configured with executable instructions to perform operations further comprising:
 determining whether a successive gate of the quantization and pruning gates to the plurality of gates is selected for combination; and
 outputting the quantized tensor of a last iteration in response to determining that the successive gate is not selected for combination.

16. The computing device of claim 14, wherein the processing device is configured with executable instructions to perform operations further comprising:
 receiving a tensor by the quantization and pruning gates;
 clipping the tensor to a range of values producing a clipped tensor; and
 quantizing the clipped tensor to a lowest bit-width producing a clipped quantized tensor, wherein quantizing a residual error of a quantized tensor to a scale of a next bit-width for a first iteration comprises quantizing a residual error of the clipped quantized tensor to the scale of the next bit-width, wherein the next bit-width is greater than the lowest bit-width.

17. The computing device of claim 16, wherein the processing device is configured with executable instructions to perform operations further comprising:
 determining whether a gate of the quantization and pruning gates preceding the plurality of gates is selected for combination; and
 outputting the clipped quantized tensor in response to determining that the gate preceding the plurality of gates is not selected for combination.

18. The computing device of claim 17, wherein the processing device is configured with executable instructions to perform operations such that quantizing a residual error of a quantized tensor to a scale of a next bit-width producing a residual error quantized tensor, and adding the quantized tensor and the residual error quantized tensor producing a next quantized tensor is further performed in response to determining that the gate preceding the plurality of gates is selected for combination.

19. The computing device of claim 16, wherein the processing device is configured with executable instructions to perform operations further comprising, in response to determining that the plurality of gates are selected for combination, iteratively for each successive gate of the plurality of gates selected for combination computing a residual error of a quantized tensor by subtracting the quantized tensor from the clipped tensor.

20. The computing device of claim 14, wherein the processing device is configured with executable instructions to perform operations further comprising:
 receiving a weight tensor by the quantization and pruning gates;
 determining whether a gate of the quantization and pruning gates preceding the plurality of gates is selected for combination; and
 outputting a tensor configured to prune the weight tensor in response to determining that the gate preceding the plurality of gates is not selected for combination.

21. The computing device of claim 14, wherein the processing device is configured with executable instructions to perform operations further comprising training the quantization and pruning gates using a regularizer configured to achieve a target balance of efficiency of a neural network and accuracy of the neural network by selecting fewer gates for combination producing a lower bit-width and more pruned quantized tensor favoring efficiency in comparison to selecting more gates for combination producing a higher bit-width and less pruned quantized tensor favoring accuracy.

22. The computing device of claim 21, wherein the processing device is configured with executable instructions to perform operations further comprising setting a hyperparameter for the regularizer such that the hyperparameter strengthens regularization on a basis of an efficiency factor of the neural network.

23. The computing device of claim 21, wherein the processing device is configured with executable instructions to perform operations further comprising setting a hyperparameter for the regularizer configured to control the target balance of efficiency of a neural network and accuracy of the neural network.

24. The computing device of claim 21, wherein the processing device is configured with executable instructions to perform operations such that training the quantization and pruning gates using a regularizer comprises training the quantization and pruning gates to select no gates for combination for a group of weights of a weight tensor, wherein selecting no gates prunes the group of weights reducing a cost of an efficiency factor of the neural network.

25. The computing device of claim 14, wherein the processing device is configured with executable instructions to perform operations further comprising training the quantization and pruning gates for determining values of gates, including the plurality of gates, based on variational approximation of a posterior distribution of the quantization and pruning gates, wherein the values of the gates are configured to indicate to the quantization and pruning gates whether the gates are selected for combination.

26. The computing device of claim 14, wherein the processing device is configured with executable instructions to perform operations such that quantizing a residual error of a quantized tensor to a scale of a next bit-width producing a residual error quantized tensor comprises quantizing the residual error of the quantized tensor to the scale of the next bit-width producing the residual error quantized tensor, wherein the next bit-width doubles for each successive iteration.

27. A non-transitory processor-readable storage medium having stored thereon processor-executable instructions configured to cause a processor of a computing device to perform operations comprising:
   determining whether a plurality of gates of quantization and pruning gates are selected for combination; and
   in response to determining that the plurality of gates are selected for combination, iteratively for each successive gate of the plurality of gates selected for combination:
      quantizing a residual error of a quantized tensor to a scale of a next bit-width producing a residual error quantized tensor, wherein the next bit-width increases for each successive iteration; and
      adding the quantized tensor and the residual error quantized tensor producing a next quantized tensor, wherein the next quantized tensor has the next bit-width, and wherein the next quantized tensor is the quantized tensor for a successive iteration.

28. The non-transitory processor-readable storage medium of claim 27, wherein the stored processor-executable instructions are configured to cause the processor of the computing device to perform operations further comprising:
   determining whether a successive gate of the quantization and pruning gates to the plurality of gates is selected for combination; and
   outputting the quantized tensor of a last iteration in response to determining that the successive gate is not selected for combination.

29. The non-transitory processor-readable storage medium of claim 27, wherein the stored processor-executable instructions are configured to cause the processor of the computing device to perform operations further comprising:
   receiving a tensor by the quantization and pruning gates;
   clipping the tensor to a range of values producing a clipped tensor; and
   quantizing the clipped tensor to a lowest bit-width producing a clipped quantized tensor, wherein quantizing a residual error of a quantized tensor to a scale of a next bit-width for a first iteration comprises quantizing a residual error of the clipped quantized tensor to the scale of the next bit-width, wherein the next bit-width is greater than the lowest bit-width.

30. The non-transitory processor-readable storage medium of claim 29, wherein the stored processor-executable instructions are configured to cause the processor of the computing device to perform operations further comprising:
   determining whether a gate of the quantization and pruning gates preceding the plurality of gates is selected for combination; and
   outputting the clipped quantized tensor in response to determining that the gate preceding the plurality of gates is not selected for combination.

31. The non-transitory processor-readable storage medium of claim 30, wherein the stored processor-executable instructions are configured to cause the processor of the computing device to perform operations such that quantizing a residual error of a quantized tensor to a scale of a next bit-width producing a residual error quantized tensor, and adding the quantized tensor and the residual error quantized tensor producing a next quantized tensor is further performed in response to determining that the gate preceding the plurality of gates is selected for combination.

32. The non-transitory processor-readable storage medium of claim 29, wherein the stored processor-executable instructions are configured to cause the processor of the computing device to perform operations further comprising, in response to determining that the plurality of gates are selected for combination, iteratively for each successive gate of the plurality of gates selected for combination computing a residual error of a quantized tensor by subtracting the quantized tensor from the clipped tensor.

33. The non-transitory processor-readable storage medium of claim 27, wherein the stored processor-executable instructions are configured to cause the processor of the computing device to perform operations further comprising:
   receiving a weight tensor by the quantization and pruning gates;
   determining whether a gate of the quantization and pruning gates preceding the plurality of gates is selected for combination; and
   outputting a tensor configured to prune the weight tensor in response to determining that that the gate preceding the plurality of gates is not selected for combination.

34. The non-transitory processor-readable storage medium of claim 27, wherein the stored processor-executable instructions are configured to cause the processor of the computing device to perform operations further comprising training the quantization and pruning gates using a regularizer configured to achieve a target balance of efficiency of a neural network and accuracy of the neural network by selecting fewer gates for combination producing a lower bit-width and more pruned quantized tensor favoring efficiency in comparison to selecting more gates for combination producing a higher bit-width and less pruned quantized tensor favoring accuracy.

35. The non-transitory processor-readable storage medium of claim 34, wherein the stored processor-executable instructions are configured to cause the processor of the computing device to perform operations further comprising setting a hyperparameter for the regularizer such that the hyperparameter strengthens regularization on a basis of an efficiency factor of the neural network.

36. The non-transitory processor-readable storage medium of claim 34, wherein the stored processor-executable instructions are configured to cause the processor of the computing device to perform operations further comprising setting a hyperparameter for the regularizer configured to control the target balance of efficiency of a neural network and accuracy of the neural network.

37. The non-transitory processor-readable storage medium of claim 34, wherein the stored processor-executable instructions are configured to cause the processor of the computing device to perform operations such that training the quantization and pruning gates using a regularizer comprises training the quantization and pruning gates to select no gates for combination for a group of weights of a weight tensor, wherein selecting no gates prunes the group of weights reducing a cost of an efficiency factor of the neural network.

38. The non-transitory processor-readable storage medium of claim 27, wherein the stored processor-executable instructions are configured to cause the processor of the computing device to perform operations further comprising training the quantization and pruning gates for determining values of gates, including the plurality of gates, based on variational approximation of a posterior distribution of the quantization and pruning gates, wherein the values of the gates are configured to indicate to the quantization and pruning gates whether the gates are selected for combination.

39. The non-transitory processor-readable storage medium of claim 27, wherein the stored processor-executable instructions are configured to cause the processor of the computing device to perform operations such that quantizing a residual error of a quantized tensor to a scale of a next bit-width producing a residual error quantized tensor comprises quantizing the residual error of the quantized tensor to the scale of the next bit-width producing the residual error quantized tensor, wherein the next bit-width doubles for each successive iteration.

40. A computing device, comprising:
means for determining whether a plurality of gates of quantization and pruning gates are selected for combination; and
means for iteratively performing operations for each successive gate of the plurality of gates selected for combination in response to determining that the plurality of gates are selected for combination comprising:
means for quantizing a residual error of a quantized tensor to a scale of a next bit-width producing a residual error quantized tensor, wherein the next bit-width increases for each successive iteration; and
means for adding the quantized tensor and the residual error quantized tensor producing a next quantized tensor, wherein the next quantized tensor has the next bit-width, and wherein the next quantized tensor is the quantized tensor for a successive iteration.

41. The computing device of claim 40, further comprising:
means for determining whether a successive gate of the quantization and pruning gates to the plurality of gates is selected for combination; and
means for outputting the quantized tensor of a last iteration in response to determining that the successive gate is not selected for combination.

42. The computing device of claim 40, further comprising:
means for receiving a tensor by the quantization and pruning gates;
means for clipping the tensor to a range of values producing a clipped tensor; and
means for quantizing the clipped tensor to a lowest bit-width producing a clipped quantized tensor, wherein means for quantizing a residual error of a quantized tensor to a scale of a next bit-width for a first iteration comprises means for quantizing a residual error of the clipped quantized tensor to the scale of the next bit-width, wherein the next bit-width is greater than the lowest bit-width.

43. The computing device of claim 42, further comprising:
means for determining whether a gate of the quantization and pruning gates preceding the plurality of gates is selected for combination; and
means for outputting the clipped quantized tensor in response to determining that the gate preceding the plurality of gates is not selected for combination.

44. The computing device of claim 43, wherein means for iteratively performing operations for each successive gate of the plurality of gates selected for combination of quantizing a residual error of a quantized tensor to a scale of a next bit-width producing a residual error quantized tensor, and adding the quantized tensor and the residual error quantized tensor producing a next quantized tensor further in response to determining that the gate preceding the plurality of gates is selected for combination.

45. The computing device of claim 42, further comprising means for computing a residual error of a quantized tensor by subtracting the quantized tensor from the clipped tensor iteratively for each successive gate of the plurality of gates selected for combination in response to determining that the plurality of gates are selected for combination.

46. The computing device of claim 40, further comprising:
means for receiving a weight tensor by the quantization and pruning gates;
means for determining whether a gate of the quantization and pruning gates preceding the plurality of gates is selected for combination; and
means for outputting a tensor configured to prune the weight tensor in response to determining that the gate preceding the plurality of gates is not selected for combination.

47. The computing device of claim 40, further comprising means for training the quantization and pruning gates using a regularizer configured to achieve a target balance of efficiency of a neural network and accuracy of the neural network by selecting fewer gates for combination producing a lower bit-width and more pruned quantized tensor favoring efficiency in comparison to selecting more gates for combination producing a higher bit-width and less pruned quantized tensor favoring accuracy.

48. The computing device of claim 47, further comprising means for setting a hyperparameter for the regularizer such that the hyperparameter strengthens regularization on a basis of an efficiency factor of the neural network.

49. The computing device of claim 47, further comprising means for setting a hyperparameter for the regularizer configured to control the target balance of efficiency of a neural network and accuracy of the neural network.

50. The computing device of claim 47, wherein means for training the quantization and pruning gates using a regularizer comprises means for training the quantization and pruning gates to select no gates for combination for a group of weights of a weight tensor, wherein selecting no gates prunes the group of weights reducing a cost of an efficiency factor of the neural network.

51. The computing device of claim 40, further comprising means for training the quantization and pruning gates for determining values of gates, including the plurality of gates, based on variational approximation of a posterior distribution of the quantization and pruning gates, wherein the values of the gates are configured to indicate to the quantization and pruning gates whether the gates are selected for combination.

52. The computing device of claim 40, wherein means for quantizing a residual error of a quantized tensor to a scale of a next bit-width producing a residual error quantized tensor comprises means for quantizing the residual error of the quantized tensor to the scale of the next bit-width producing the residual error quantized tensor, wherein the next bit-width doubles for each successive iteration.

53. A method for generating a mixed-precision artificial neural network, comprising:
quantizing a first layer of the mixed-precision artificial neural network at a first precision determined using corresponding stochastic gates of quantization and pruning gates; and
quantizing a second layer of the mixed-precision artificial neural network at a second precision determined using corresponding stochastic gates of the quantization and pruning gates, wherein the first precision and the second precision are different.

54. The method of claim 53, further comprising:
determining whether a plurality of stochastic gates of the quantization and pruning gates are selected for combination; and
in response to determining that the plurality of stochastic gates are selected for combination, iteratively for each successive stochastic gate selected for combination:
quantizing a residual error of a quantized tensor to a scale of a next bit-width producing a residual error quantized tensor, wherein the next bit-width increases for each successive iteration; and
adding the quantized tensor and the residual error quantized tensor producing a next quantized tensor, wherein the next quantized tensor has the next bit-width, and wherein the next quantized tensor is the quantized tensor for a successive iteration.

55. The method of claim 54, further comprising:
determining whether a successive stochastic gate to the plurality of stochastic gates is selected for combination; and
outputting the quantized tensor of a last iteration in response to determining that the successive stochastic gate is not selected for combination.

56. The method of claim 54, further comprising:
receiving a tensor by the quantization and pruning gates;
clipping the tensor to a range of values producing a clipped tensor; and
quantizing the clipped tensor to a lowest bit-width producing a clipped quantized tensor, wherein quantizing a residual error of a quantized tensor to a scale of a next bit-width for a first iteration comprises quantizing a residual error of the clipped quantized tensor to the scale of the next bit-width, wherein the next bit-width is greater than the lowest bit-width.

57. The method of claim 56, further comprising:
determining whether a stochastic gate of the quantization and pruning gates preceding the plurality of stochastic gates is selected for combination; and
outputting the clipped quantized tensor in response to determining that the stochastic gate preceding the plurality of stochastic gates is not selected for combination.

58. The method of claim 57, wherein quantizing a residual error of a quantized tensor to a scale of a next bit-width producing a residual error quantized tensor, and adding the quantized tensor and the residual error quantized tensor producing a next quantized tensor is further performed in response to determining that the stochastic gate preceding the plurality of stochastic gates is selected for combination.

59. The method of claim 56, further comprising, in response to determining that the plurality of stochastic gates are selected for combination, iteratively for each successive stochastic gate of the plurality of stochastic gates selected for combination computing a residual error of a quantized tensor by subtracting the quantized tensor from the clipped tensor.

60. The method of claim 54, further comprising:
receiving a weight tensor by the quantization and pruning gates;
determining whether a stochastic gate of the quantization and pruning gates preceding the plurality of stochastic gates is selected for combination; and
outputting a tensor configured to prune the weight tensor in response to determining that that the stochastic gate preceding the plurality of stochastic gates is not selected for combination.

61. The method of claim 54, further comprising training the quantization and pruning gates using a regularizer configured to achieve a target balance of efficiency of a neural network and accuracy of the neural network by selecting fewer stochastic gates for combination producing a lower bit-width and more pruned quantized tensor favoring efficiency in comparison to selecting more stochastic gates for combination producing a higher bit-width and less pruned quantized tensor favoring accuracy.

62. The method of claim 61, further comprising setting a hyperparameter for the regularizer such that the hyperparameter strengthens regularization on a basis of an efficiency factor of the neural network.

63. The method of claim 61, further comprising setting a hyperparameter for the regularizer configured to control the target balance of efficiency of a neural network and accuracy of the neural network.

64. The method of claim 61, wherein training the quantization and pruning gates using a regularizer comprises training the quantization and pruning gates to select no stochastic gates for combination for a group of weights of a weight tensor, wherein selecting no stochastic gates prunes the group of weights reducing a cost of an efficiency factor of the neural network.

65. The method of claim 54, further comprising training the quantization and pruning gates for determining values of stochastic gates, including the plurality of stochastic gates, based on variational approximation of a posterior distribution of the quantization and pruning gates, wherein the values of the stochastic gates are configured to indicate to the quantization and pruning gates whether the stochastic gates are selected for combination.

66. The method of claim 54, wherein quantizing a residual error of a quantized tensor to a scale of a next bit-width producing a residual error quantized tensor comprises quantizing the residual error of the quantized tensor to the scale of the next bit-width producing the residual error quantized tensor, wherein the next bit-width doubles for each successive iteration.

* * * * *